Patented Oct. 18, 1932

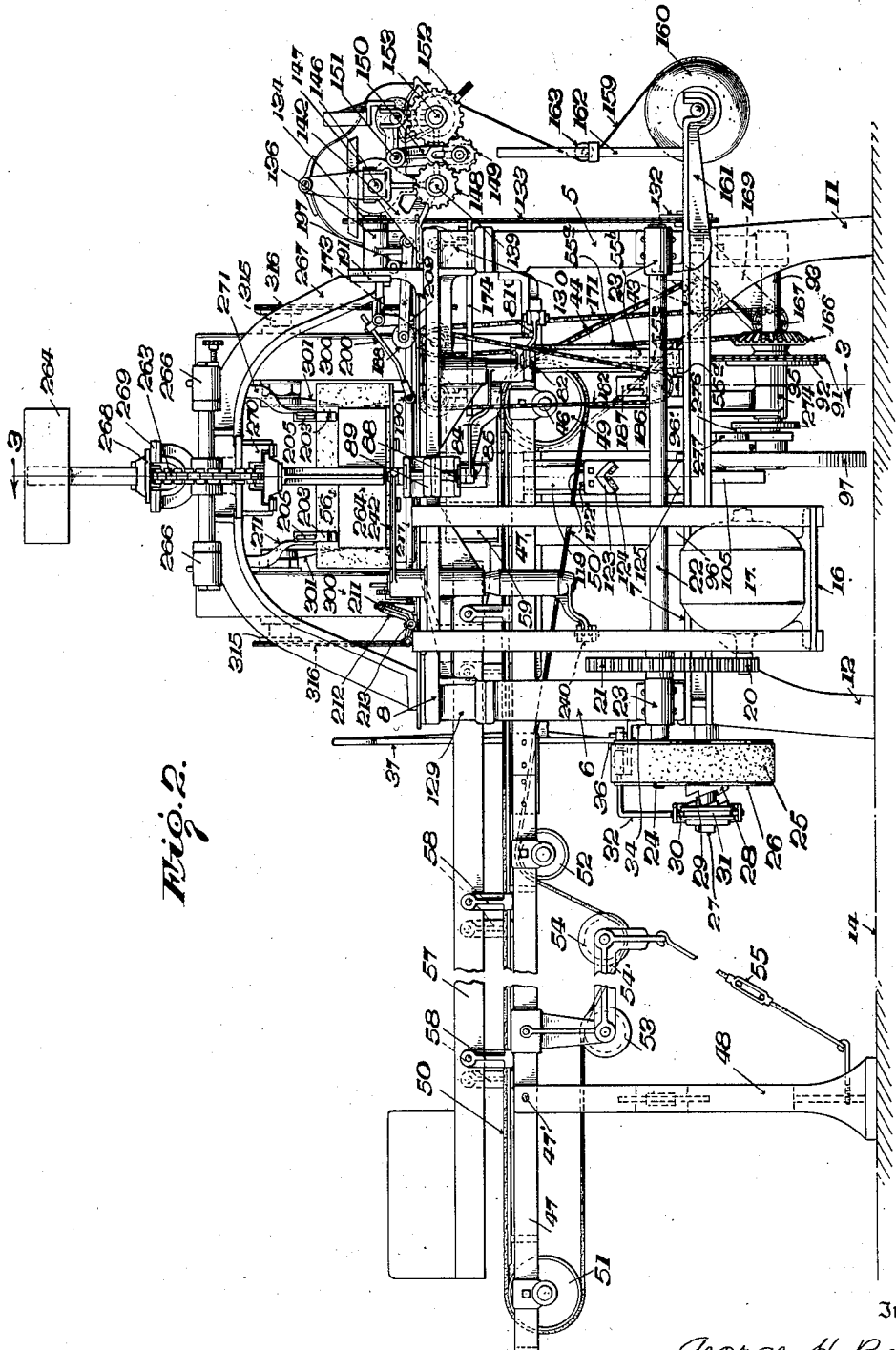

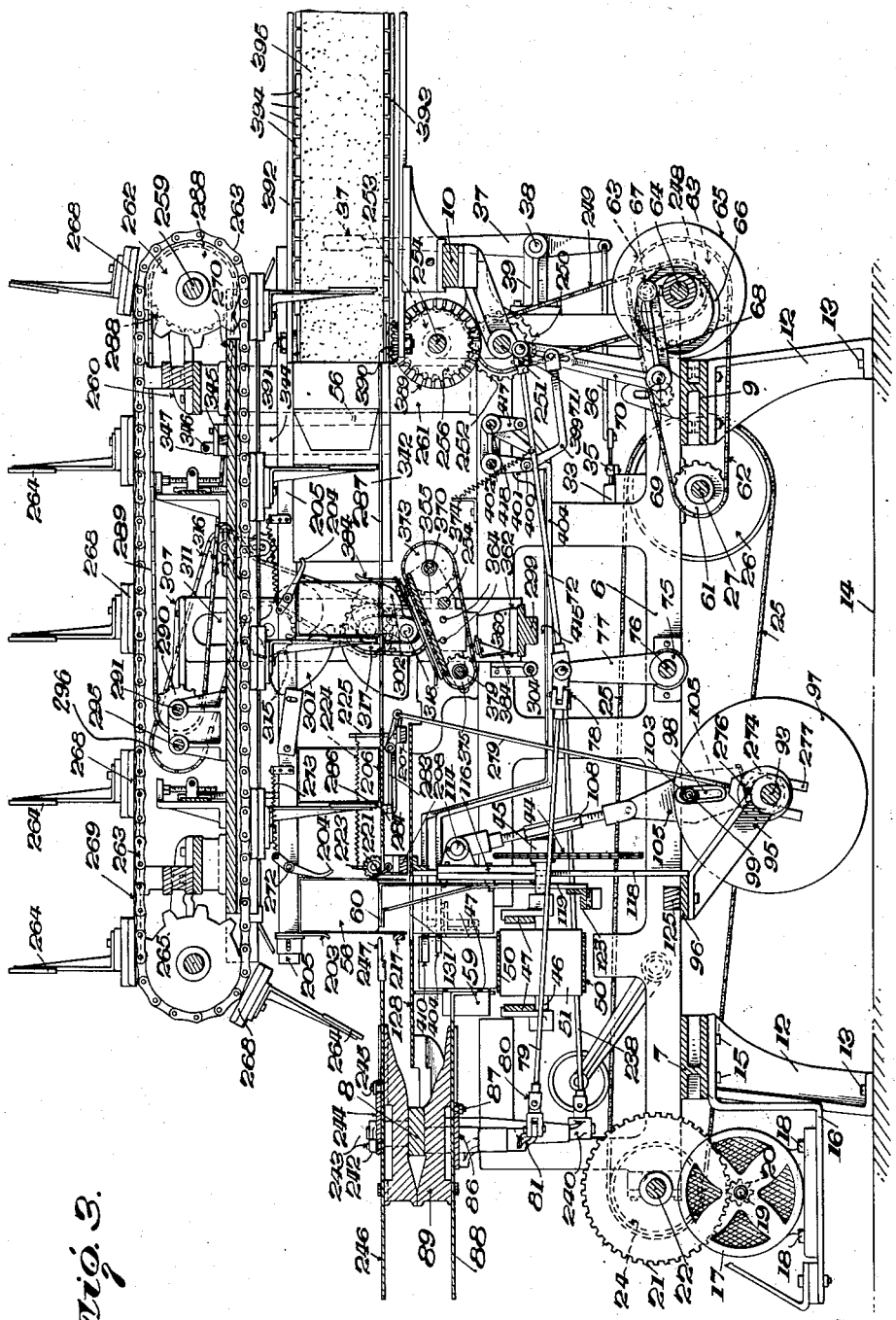

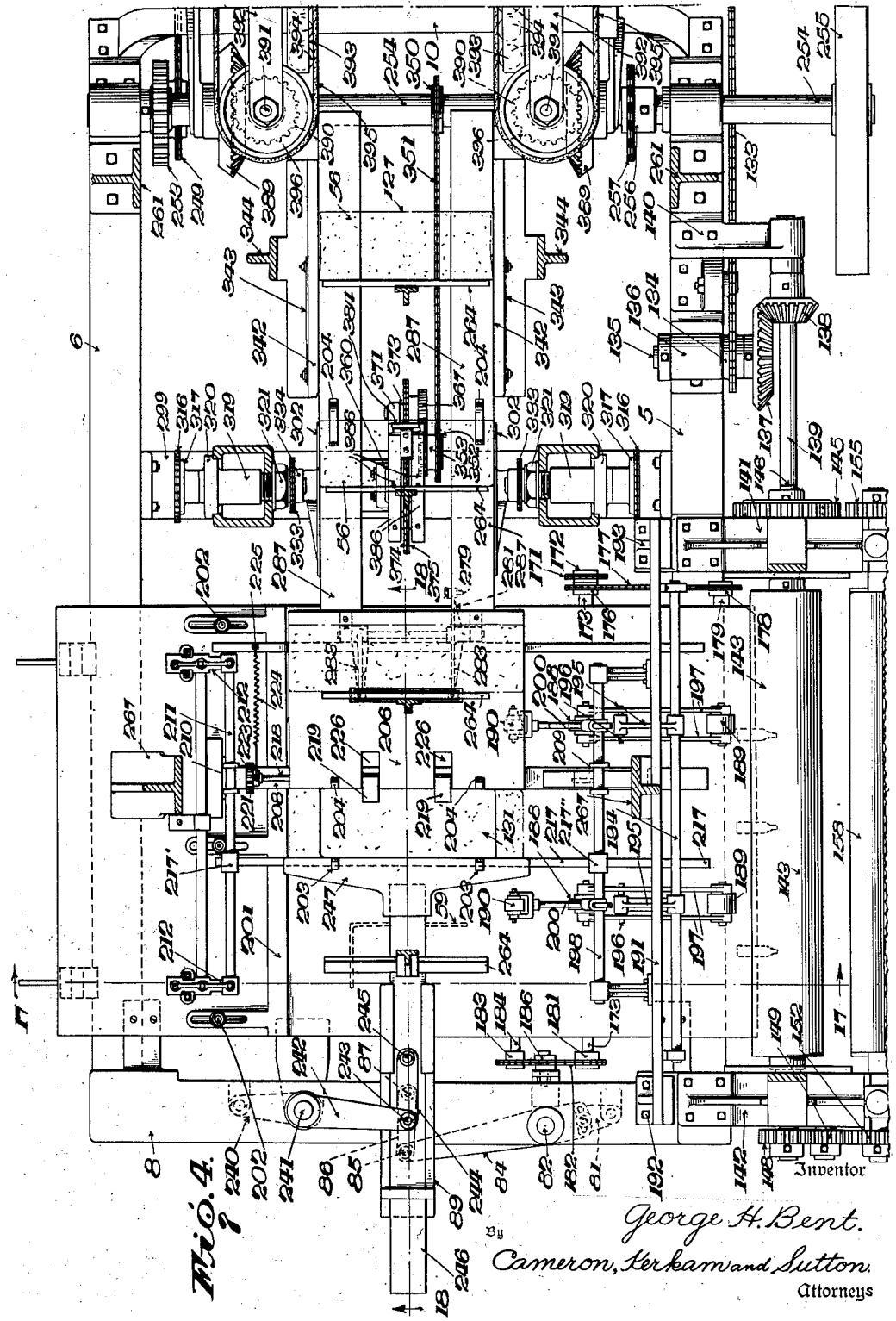

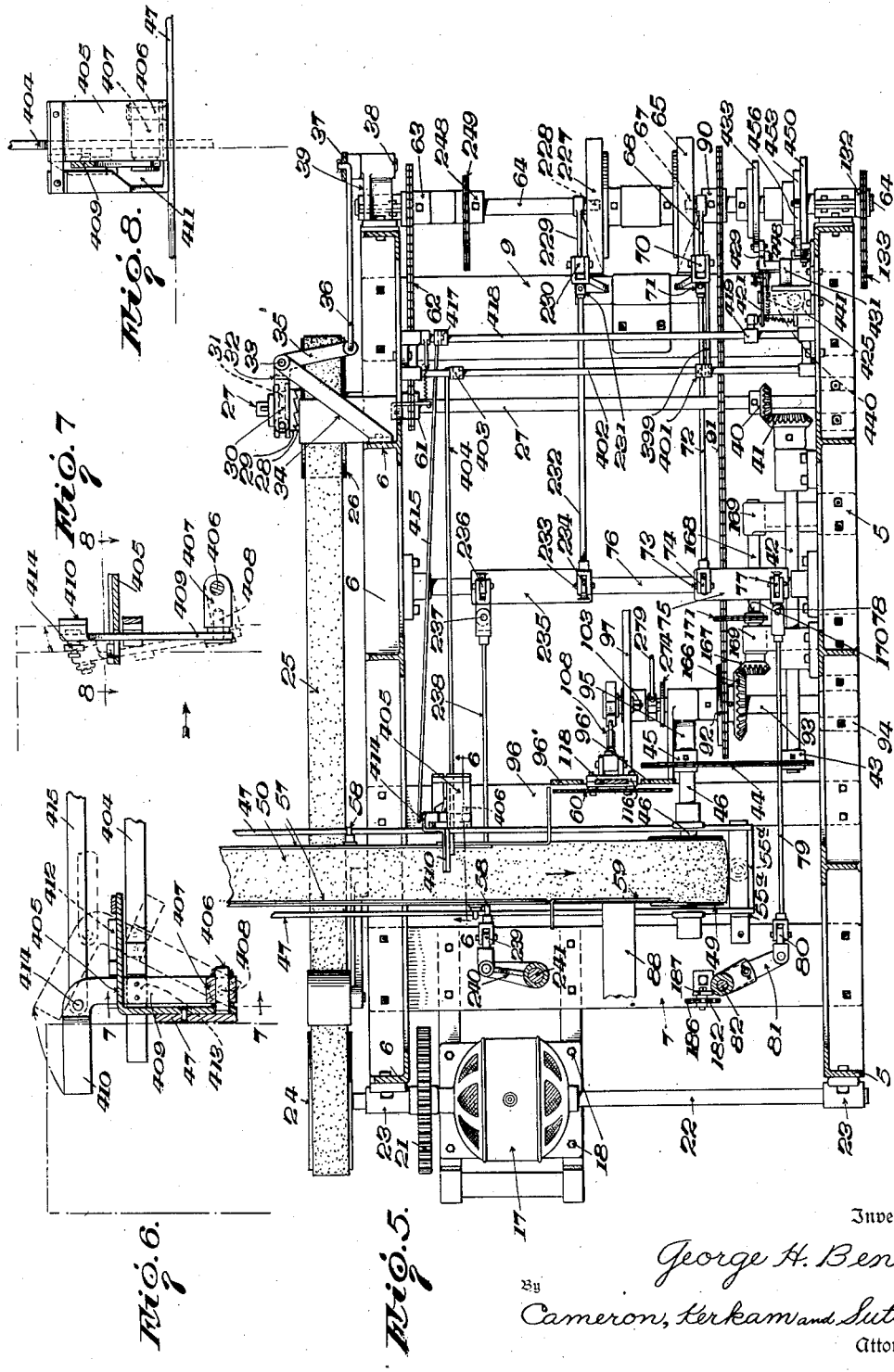

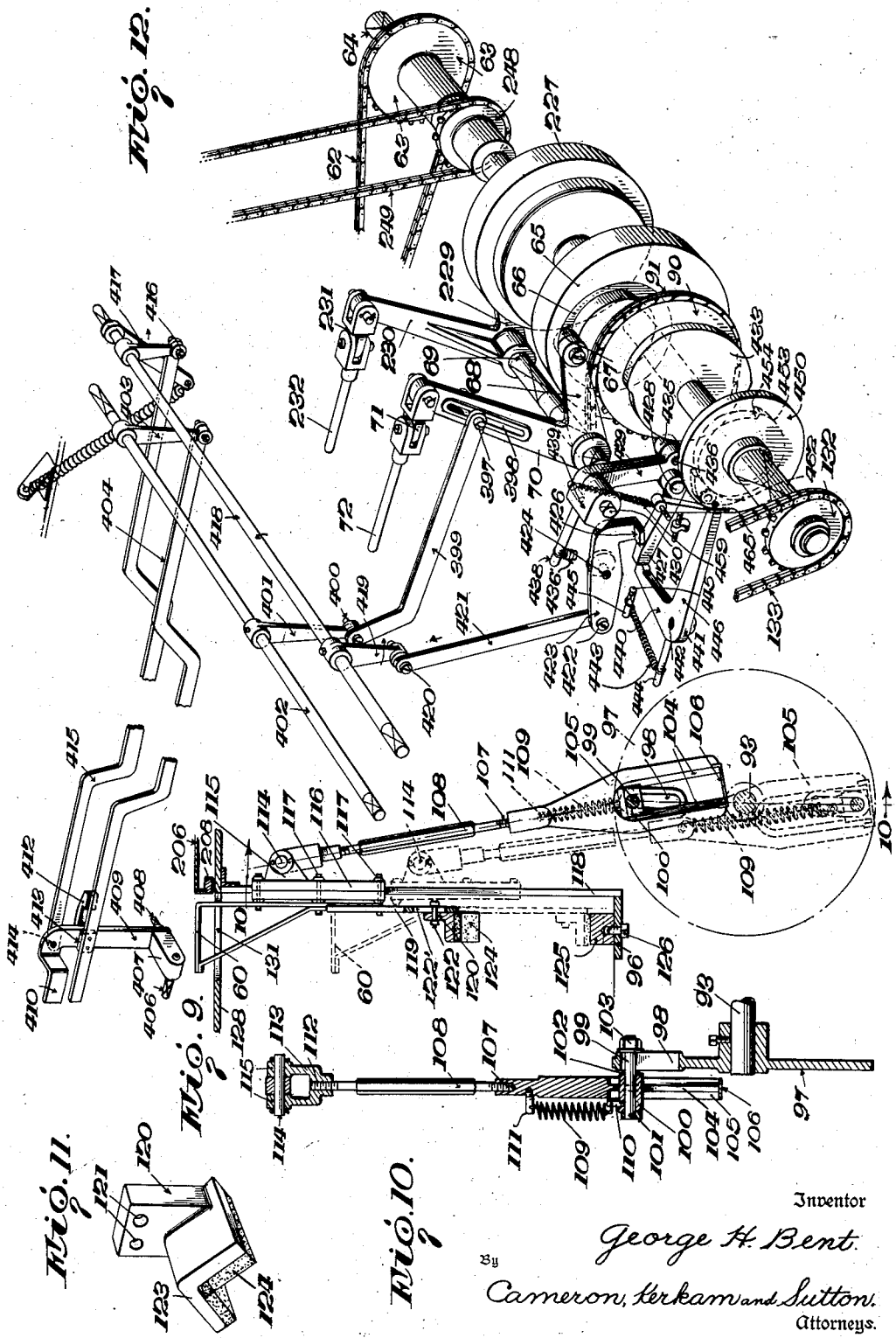

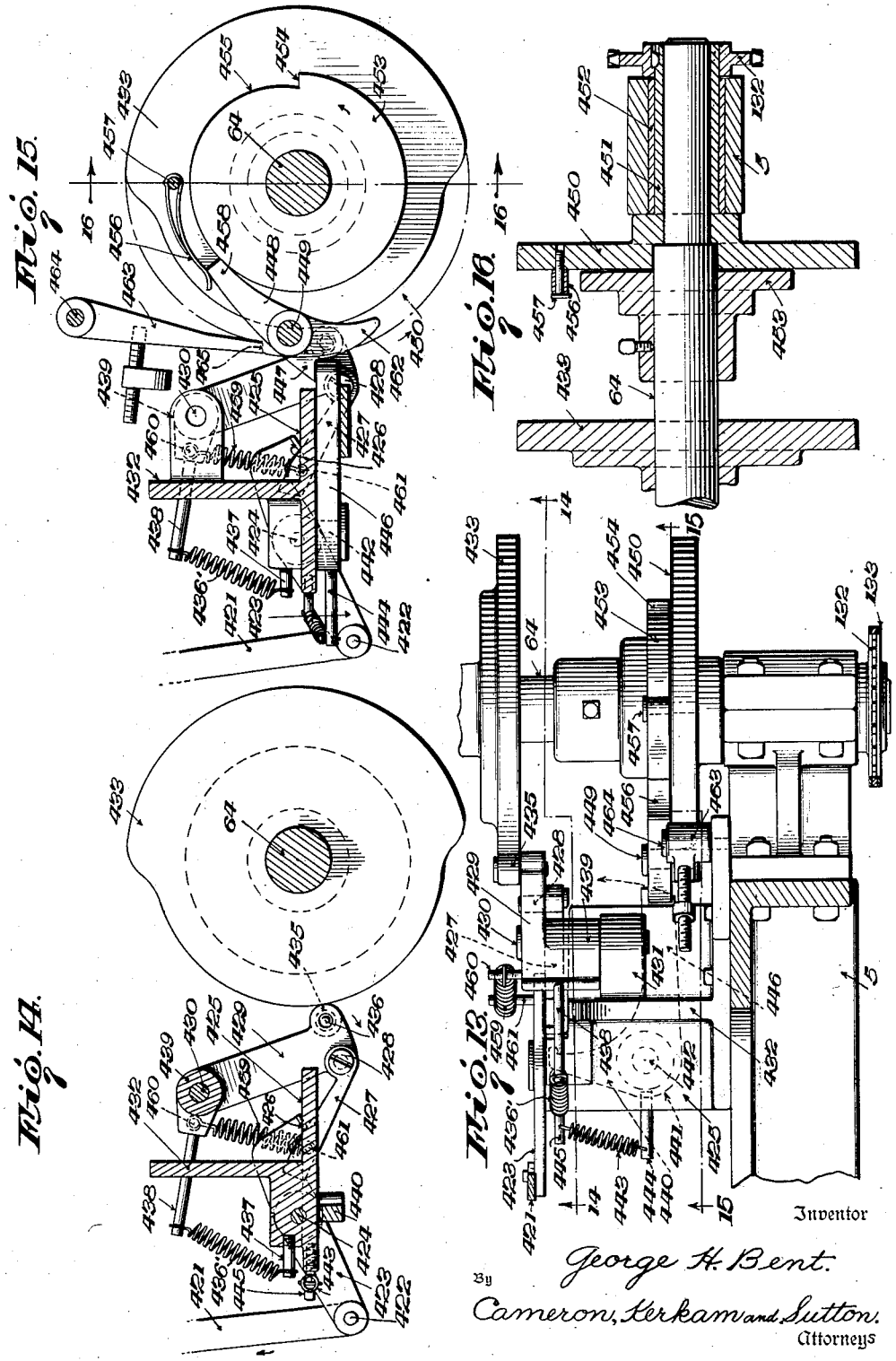

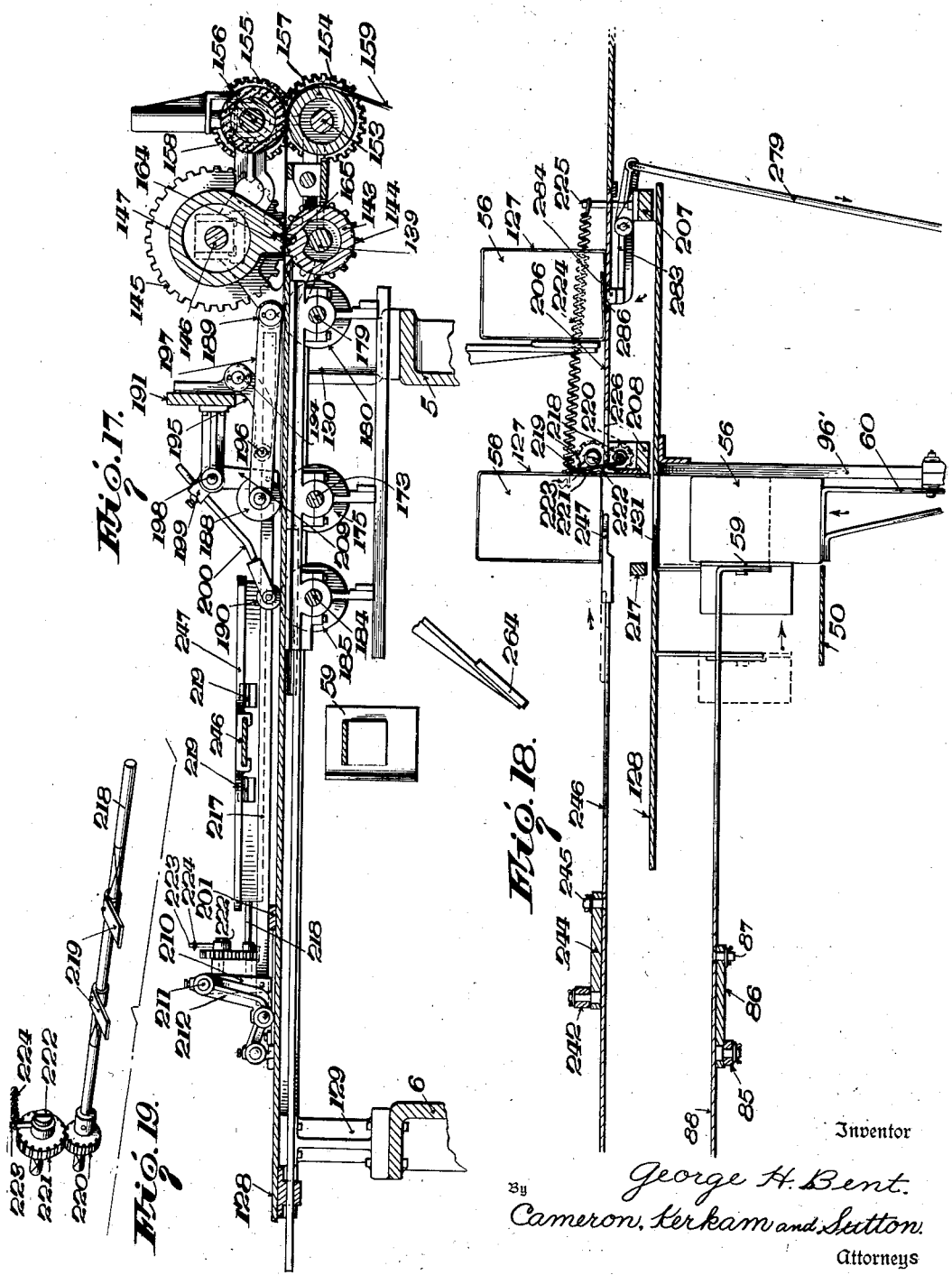

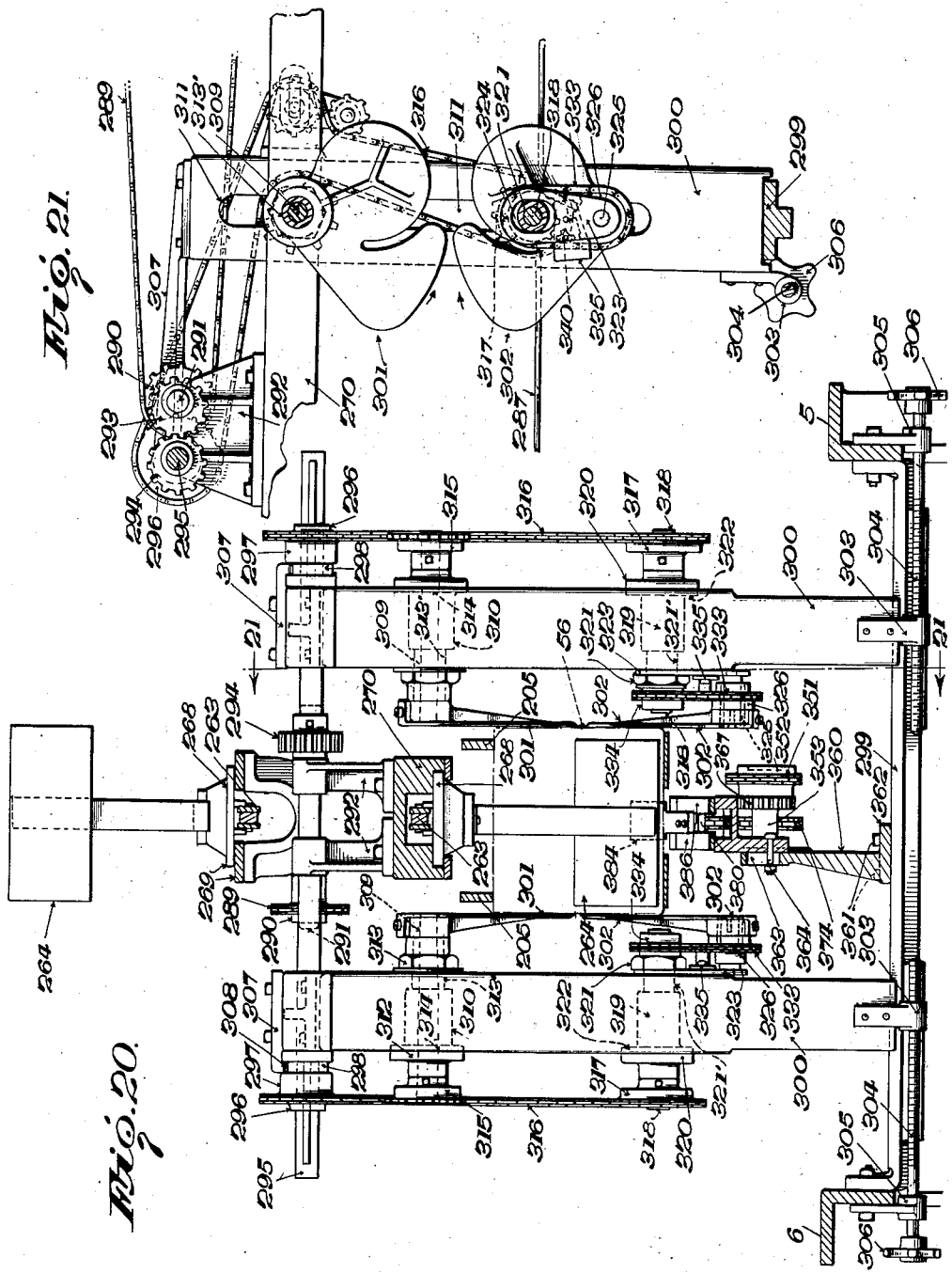

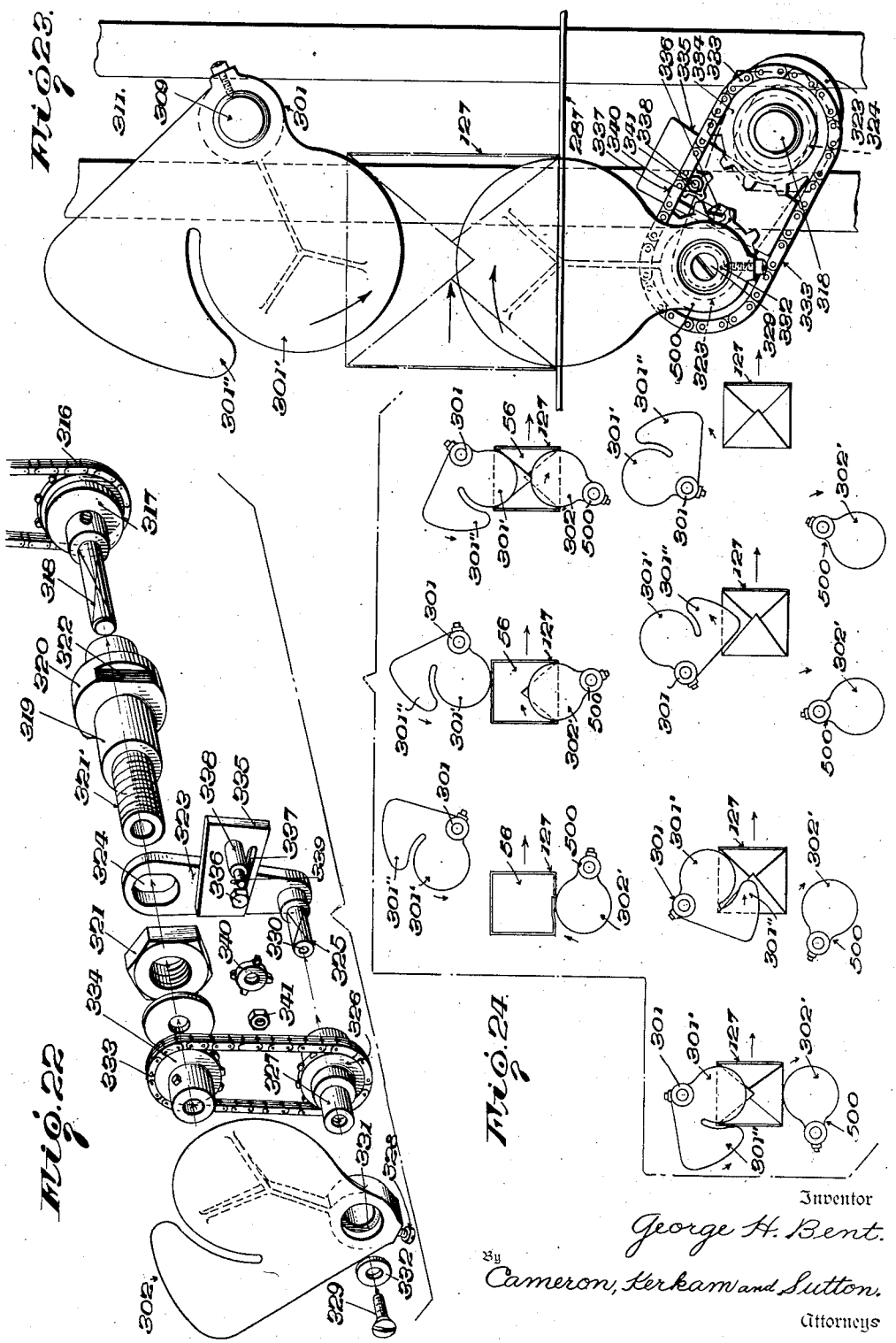

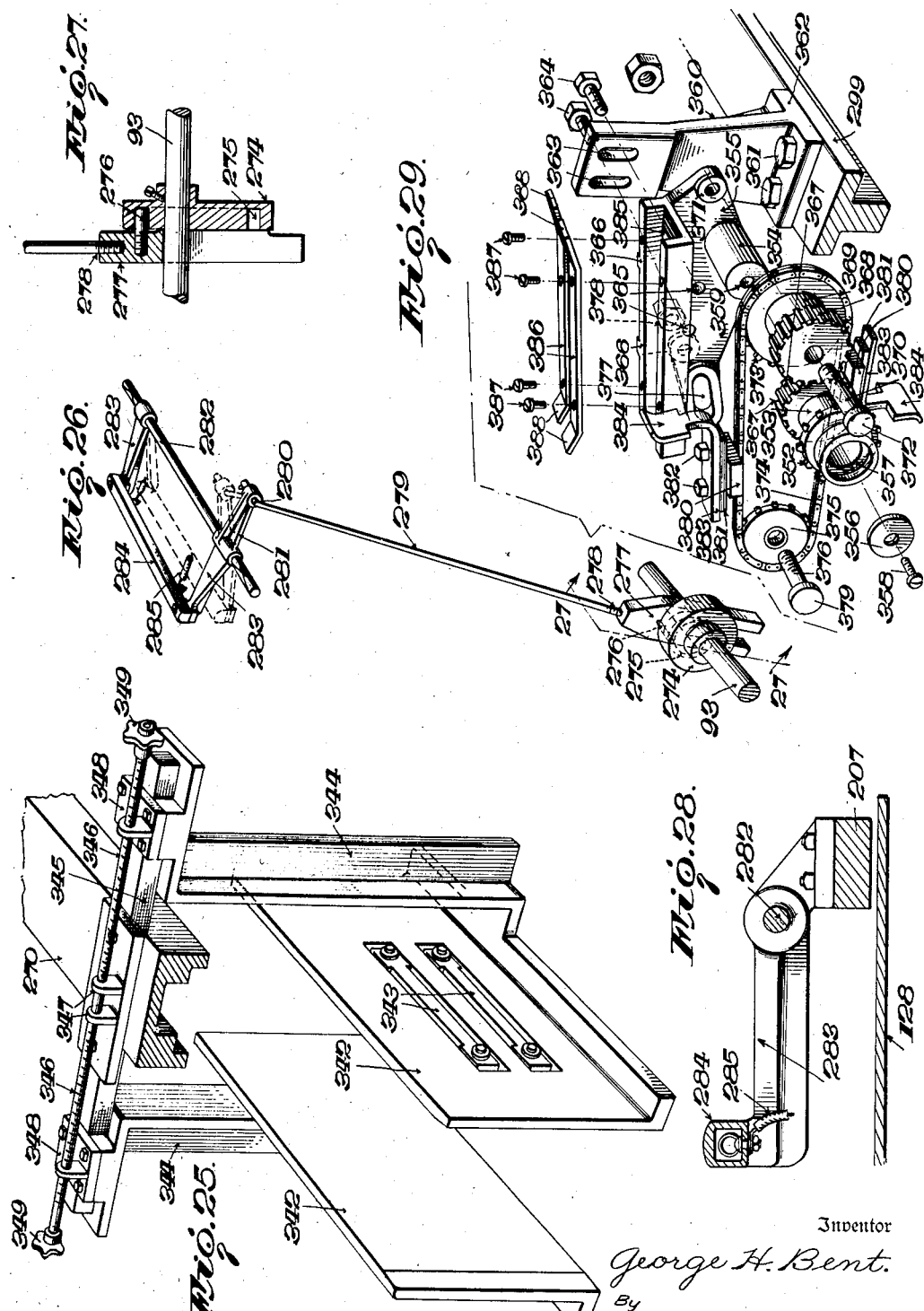

1,883,229

UNITED STATES PATENT OFFICE

GEORGE H. BENT, OF BATTLE CREEK, MICHIGAN

WRAPPING MACHINE

Application filed April 1, 1929. Serial No. 351,731.

This invention relates to wrapping machines and while capable of general use is particularly adapted for wrapping packages of goods in the form of filled and sealed paper cartons or the like.

It has heretofore been proposed, in machines of this type, to employ a number of cam driven cams for operating the various movable parts of the machine.

One object of the present invention is to reduce, as far as possible, the number of cams employed, and to provide a machine of increased efficiency and capacity.

It has further been proposed, in machines of this type, to provide a package elevator operated through a system of links and levers from a cam and acting to lift the package into engagement with a sheet of paper to be wrapped therearound. The elevator operating mechanism however, has generally embodied an excessive number of parts and the mounting of the elevator has not been such as to provide for ready adjustment of the throw of the same.

Another object of the present invention is to provide a package elevator with improved operating mechanism therefor embodying a minimum number of parts which, together with the elevator itself, are arranged compactly and enable the throw of the elevator to be readily adjusted as desired.

It has further been proposed, in machines of this type, to seal the wrapper about the package by passing it over a heated plate or the like. This procedure, however, frequently disfigures or mars the entire bottom surface of the package engaged with said plate, and in some cases wrinkles or bulges the wrapper so that an unsightly package is produced.

Another object of the invention is to provide an improved sealing mechanism that avoids these disadvantages and heat seals the bottom of the package only adjacent the overlapped portions of the wrapper thereon.

It has further been proposed, in machines of this type, to provide devices for folding in the projecting ends of the wrapper. These folding devices, however, must be changed or replaced by others when it is desired to fold the wrapper about the ends of a package of square or other than rectangular cross section, and this has resulted in the necessity for added equipment, loss of time in changing folders, and decreased efficiency of the machine.

Another object of the invention is to provide folding devices which eliminate these disadvantages and are quickly interchangeable and relatively adjustable so that packages of various sizes and cross sectional forms can be wrapped without difficulty.

It has further been proposed in machines of this type, to move the packages past the folding devices by pushers or the like attached to the package conveyor, and to provide said pushers with clamps or the like to hold the wrapper tightly in engagement with the package during operation of the end folders thereon.

Another object of the present invention is to provide improved means which avoids the use of separate clamps on the package pushers and embodies a single instrumentality operating in conjunction with said pushers to hold the wrapper of each package in place when fed past the end folders by said pushers.

These and other objects of the present invention will be apparent as the following description thereof proceeds, and in order to more clearly understand the invention, reference may be had to the appended drawings which illustrate one embodiment of the inventive idea and wherein,—

Fig. 2 is an end view of said machine looking from the left of Fig. 1;

Fig. 3 is a vertical longitudinal sectional view on the line 3—3 of Fig. 2;

Fig. 4 is an enlarged horizontal sectional view on the line 4—4 of Fig. 1;

Fig. 5 is a horizontal sectional view on the line 5—5 of Fig. 1;

Fig. 6 is an enlarged vertical sectional view on the line 6—6 of Fig. 5, showing a package operated detector device;

Fig. 7 is a vertical sectional view on the line 7—7 of Fig. 6;

Fig. 8 is a horizontal sectional view on the line 8—8 of Fig. 7;

Fig. 9 is an enlarged side elevation, partly in section, of the package elevator;

Fig. 10 is a vertical sectional view on the line 10—10 of Fig. 9;

Fig. 11 is an enlarged detail perspective view of a detector device for the package elevator shown in Figs. 9 and 10;

Fig. 12 is an enlarged detail perspective view of the main cam shaft and detector controlled devices controlling the paper feed;

Fig. 13 is an enlarged top plan view of clutch mechanism shown in Figs. 5 and 12;

Fig. 14 is a vertical longitudinal sectional view on the line 14—14 of Fig. 13;

Fig. 15 is a similar view on the line 15—15 of Fig. 13;

Fig. 16 is a vertical sectional view on the line 16—16 of Fig. 15;

Fig. 17 is an enlarged transverse vertical sectional view on the line 17—17 of Fig. 4;

Fig. 18 is an enlarged vertical longitudinal sectional view on the line 18—18 of Fig. 4;

Fig. 19 is a detail perspective view of package operated stops shown in Figs. 3, 4 and 18;

Fig. 20 is an enlarged end view, partly in section, of end folding devices;

Fig. 21 is a vertical sectional view on the line 21—21 of Fig. 20;

Fig. 22 is an enlarged detail perspective view of the lower end folder, parts of which are shown separated for purposes of clearer illustration;

Fig. 23 is an enlarged side elevation of the upper and lower end folding devices, the same being shown adjusted relatively and operating on a package of square cross section;

Fig. 24 is a diagrammatic view showing the positions successively occupied by the upper and lower end folders when they are relatively adjusted and operating on a package of square cross section;

Fig. 25 is an enlarged detail perspective view of adjustable heating plates for sealing the end folds of the package;

Fig. 26 is an enlarged detail perspective view of the device for sealing the bottom seam of the package;

Fig. 27 is an enlarged vertical sectional view on the line 27—27 of Fig. 26;

Fig. 28 is an enlarged side elevation, partly in section, of the heating device shown in Fig. 26; and Fig. 29 is an enlarged detail perspective view of package clamping means, parts of which are shown separated for purposes of clearer illustration.

Figure 1:
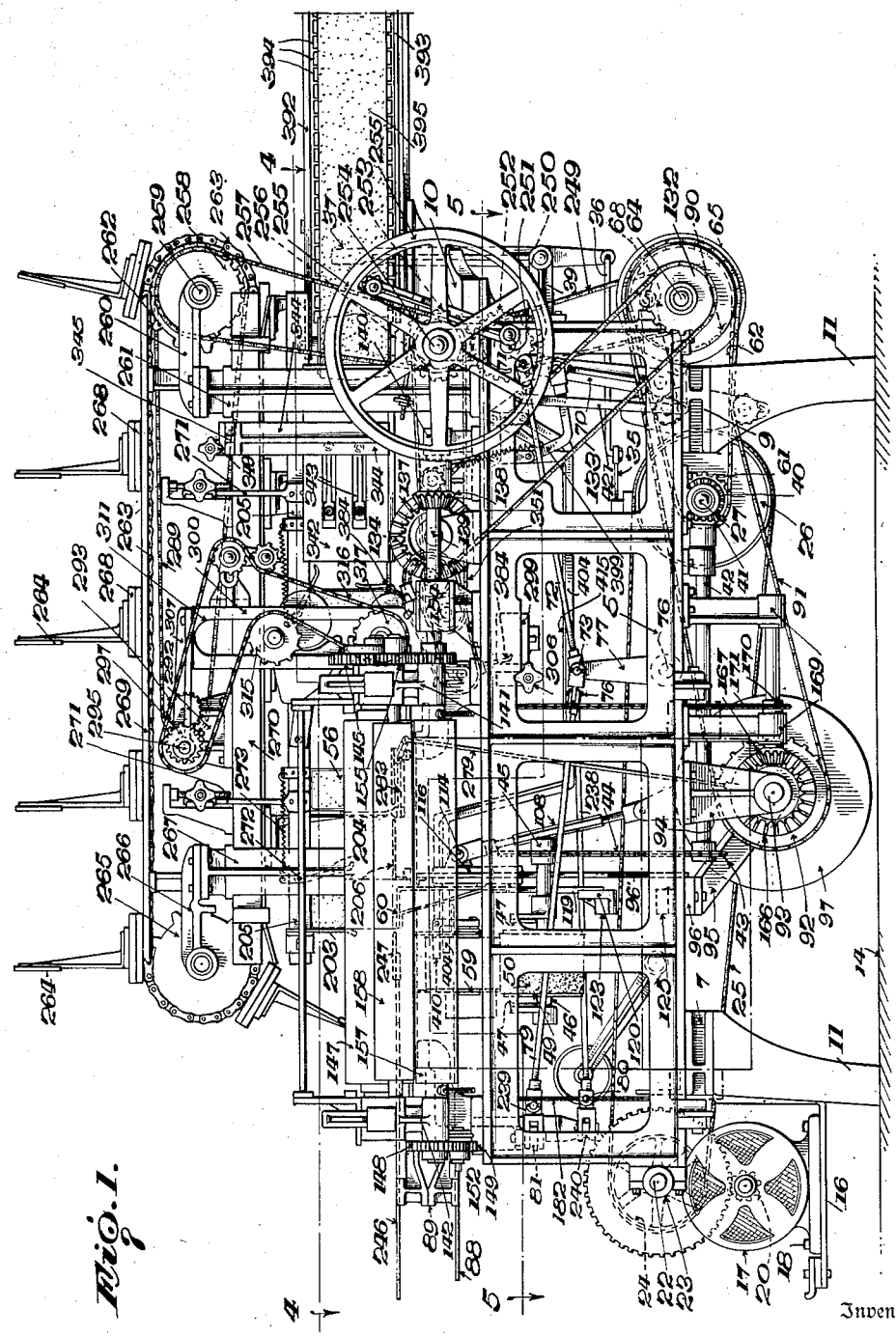
Fig. 1 is a side elevation of a package wrapping machine embodying the present invention.

Referring to the drawings, wherein like reference characters designate like parts throughout the several views, the various movable elements of the machine are supported on a pair of side frames 5, 6 spaced apart and connected together at their opposite ends by cross members 7, 8 and 9, 10 respectively. The side frames 5, 6 are in turn supported on legs 11, 11 and 12, 12 which are bolted or otherwise suitably secured, as at 13, 13 to the machine foundation 14 (Figs. 1 to 3, inclusive).

Bolted or otherwise suitably secured to the cross member 7, as at 15, 15, is a bracket 16 on which is mounted an electric motor 17. The motor 17 is supplied with electrical current from any suitable source and is bolted or otherwise suitably secured, as at 18, 18, on the bracket 16. Fixed on the armature shaft 19 of said motor is a spur pinion 20 that meshes with a spur gear 21 which is fixed on a shaft 22 extending transversely of the machine and journaled in suitable bearings 23, 23 on the side frames 5, 6 thereof. Fixed on the shaft 22 is a pulley 24 around which passes a belt 25 that also passes around a pulley 26 which is loosely mounted on a shaft 27 extending transversely of the machine and journaled in suitable bearings on the side frames 5, 6 thereof.

This shaft 27 is the main driving shaft for the various movable instrumentalities of the machine and said shaft, and therefore said instrumentalities, are connected with and disconnected from the source of power 17, by a manually operated clutch one part 28 (Figs. 2 and 5) of which is fixed on the hub of the pulley 26, the other part 29 of said clutch being keyed to and slidable along the shaft 27 for engagement with and disengagement from the clutch part 28. The clutch 28, 29 is preferably operated to start and stop the machine through the medium of a yoke 30 that is engaged in an annular grooved portion 31 of the clutch part 29. The yoke 30 depends from one arm 32 of a bell crank lever that is pivoted at 33 on a bracket 34 bolted or otherwise suitably secured on the side frame 6 of the machine. The other arm 35 of said bell crank is pivotally connected with one extremity of a link 36 the opposite extremity of which is pivotally connected with a hand lever 37 pivoted at 38 on a bracket 39 that is bolted or otherwise suitably secured on the side frame 6.

Fixed on the shaft 27 is a bevel gear 40 (Figs. 1 and 5) which meshes with a similar gear 41 that is fixed on one end of a driven shaft 42 journaled in suitable bearings on the side frame 5 of the machine. Fixed on the opposite end of the shaft 42 is a sprocket 43 around which passes a chain 44 that also passes around a sprocket 45 (Figs. 1 and 2) which is fixed on one end of a shaft 46. This shaft 46 is journaled in suitable bearings carried by the inner ends of a pair of conveyor frame members 47, 47, which extend into the machine and are supported therein for vertical adjustment in a manner to be presently described. The outer ends of the conveyor frame members 47, 47 are pivotally supported at 47' by a standard 48 bolted or otherwise suitably secured to said frame members and to the machine foundation 14, respectively (Fig. 2).

Fixed on the shaft 46 between the frame members 47, 47, is a pulley 49 around which passes a package infeed belt 50. The belt 50 also passes around a pulley 51 rotatably mounted on the conveyor frame members 47, 47. Said frame members carry an idler pulley 52 around which the belt 50 also passes. Interposed between the pulleys 51 and 52 and carried by the frame members 47, 47, is a pulley 53 over which the belt 50 also passes. In order to maintain proper tension on the belt 50 there is arranged between the pulleys 52, 53 a belt tightener 54 that is operated by a turnbuckle 55 connected with the standard 48 and a support 54'. The support 54' is pivoted on the shaft carrying pulley 53 and said support carries the pulley 54, as clearly shown in Fig. 2 of the drawings.

The inner ends of the frame members 47, 47 carry a depending yoke 55a (Fig. 2) which extends into a second yoke 55b that is supported in any suitable manner by the cross member 7. Journaled on the yoke 55b and fixed against vertical displacement with respect thereto, is a threaded shaft 55c that has threaded engagement with the walls of a suitable opening extending through the bottom of the yoke 55a. This threaded shaft has fixed thereon a hand wheel 55d for rotating the shaft 55c to thereby adjust the above described infeed conveyor vertically as desired so that it can readily feed the packages into the machine.

The packages 56 when placed on the belt 50 are fed thereby into the machine between guide rails 57 disposed at opposite sides of said belt and mounted on brackets 58 secured to the conveyor frame members 47. Each package 56, when fed into the machine by the belt 50, strikes a stop (not shown) and is pushed from said belt by a pusher 59, onto an elevator 60 that carries the package upwardly in the machine to be wrapped.

This pusher 59 (Figs. 1, 2, 3, 5 and 18) is preferably operated through the medium of the following instrumentalities. Fixed on the main drive shaft 27 is a sprocket 61 around which passes a chain 62 that also passes around a sprocket 63 which is fixed on a shaft 64 extending transversely of the machine and journaled in suitable bearings on the side frames 5, 6 thereof. The shaft 64 is thus driven from the shaft 27 by the chain 62, and said shaft 64 has fixed thereon a cam 65 in the cam groove 66 of which is engaged a roller 67. This roller 67 is journaled on one arm 68 of a bell crank that is fixed on a rockshaft 69 journaled in suitable bearings on a stationary part of the machine. The other arm 70 of said bell crank is connected by a universal connection 71 with one extremity of a link 72 the opposite extremity of which is pivotally connected at 73 with an arm 74 rigidly secured to or formed integrally with a sleeve 75 (Fig. 5). This sleeve 75 is rotatably mounted on a stay shaft 76 which extends transversely of the machine and is bolted or otherwise suitably secured to the side frames 5, 6 thereof. Fixed on or formed integrally with the sleeve 75 is a second arm 77 which is pivotally connected by a universal connection 78 with one extremity of a link 79. The opposite extremity of the link 79 is pivotally connected by a universal connection 80 with one arm 81 of a bell crank that is pivoted at 82 (Fig. 4) on the cross member 8 of the machine framework.

The other arm 84 (Figs. 2 and 4) of the last mentioned bell crank is pivotally connected at 85 with one extremity of a link 86 the opposite extremity of which is pivotally connected at 87 with a slide 88 (Fig. 3). The slide 88 carries on its forward end the pusher 59 above referred to, and said slide is mounted for reciprocating movement forwardly and rearwardly of the machine, in a suitable guideway formed on the bottom of a two-part bracket 89 bolted or otherwise suitably secured to the cross member 8 of the machine. It will appear from the foregoing, that during the operation of the machine, the pusher 59 and the slide 88 will, through the connections for the latter with the cam 65, be reciprocated so that as each package 56 arrives in front of the pusher 59 it will be pushed thereby from the infeed conveyor belt 50. When the pusher 59 moves rearwardly the elevator 60 is lowered, whereupon the pusher 59 moves forwardly and pushes the package 56 from the infeed conveyor belt 50 onto said elevator. The elevator 60 then rises to carry the package to the package wrapping and conveying mechanism hereinafter described, whereupon the elevator lowers to receive the next package from the pusher 59.

The elevator 60 (Figs. 1, 3, 5, 9, 10 and 18) is preferably operated and constructed as follows. Fixed on the shaft 64 is a sprocket 90 (Figs. 1, 5 and 12) around which passes a sprocket chain 91 that also passes around a sprocket 92 which is fixed on and drives a shaft 93. This shaft 93 extends transversely of the machine and is journaled in suitable bearings on brackets 94 and 95 (Figs. 1, 3 and 5) bolted or otherwise suitably secured to the side frame 5 and a cross member 96, respectively. The cross member 96 in turn is bolted or otherwise suitably secured to the side frames 5 and 6 and carries upwardly extending spaced plates 96', 96' (Fig. 5) which bear against and guide the package while it is being lifted by the elevator 60. Fixed on the driven shaft 93 is a wheel or disk 97 (Figs. 3, 9 and 10) provided eccentrically thereof with a radially extending elongated slot 98 in which is adjustably secured a pin 99. Pivotally mounted on the pin 99 is a block 100 which, together with said pin, can be moved along the slot 98 to any desired position of adjustment therein. The block 100 is retained in position on the pin 99 by collar 101 secured on the pin at one end thereof, and a washer 102 positioned on said pin between the block 100 and the wheel or disk 97. Adjustments of the pin 99 and the block 100 along the slot 98 are obtained by loosening a nut 103 threaded on the end of the pin 99 opposite that carrying the collar 101. Adjustments of the pin 99 and the block 100 are made for the purpose of lengthening or shortening the upward throw of the elevator 60, and when the proper adjustment has been made, the nut 103 is tightened and the pin 99 and the block 100 are secured in the desired position of adjustment.

The block 100 is slidably engaged with guides 104 that are formed on a fork 105 which extends over said block and is closed at its lower end by a removable plate 106. This fork 105 is adjustably connected at 107 with one extremity of a connecting rod 108, and said fork is yieldably connected with the block 100 by a spring 109, the opposite ends of which are secured at 110 and 111 to the block and the fork respectively.

The end of the rod 108 opposite that carrying the fork 105 is adjustably connected at 112 with a yoke 113 that is pivotally connected at 114 with a bracket 115 secured to or formed integrally with a slide 116. The slide 116 is preferably made in two parts bolted together at 117, 117, and said slide is mounted for reciprocating movement on an upwardly extending guide 118 that is bolted or otherwise suitably secured to the cross member 96.

The elevator 60 may be of any suitable construction, such as a bracket of general right angle formation that is preferably secured to the slide 116 by certain of the bolts 117 that connect the parts of said slide together. Secured to the slide 116, as by one of the bolts 117, is a plate 119 that carries on its lower end a bracket 120 provided with openings 121 for the reception of bolts or other suitable fastening devices 122 that extend through vertically disposed elongated slots 122' (Figs. 2 and 9) in the plate 119 and which, together with said slots, serve to secure said bracket to the plate 119 so that the bracket may be adjusted vertically on said plate. The bracket 120 is provided with an angular extension 123 on the underside of which is suitably secured a buffer 124 of rubber or other suitable material. The elevator 60 and the slide 116 are reciprocated by the disk 97 and the connections therefor with said slide, and during reciprocating movement of the elevator, its lowering movement is limited by engagement of the stop 120 with a stop 125 which is secured at 126 on the cross member 96 and has an upper surface conforming to the shape of the stop 120 (Fig. 2). It will be apparent, that by the described connections for the disk 97 with the elevator 60, the distance that the latter travels upwardly may be regulated as desired.

The spring 109 always tends to maintain the block 100 in engagement with the upper end of the fork 105, so that during rotation of the disk 97, raising and lowering movements are imparted to the elevator 60 by said disk. When the stop 120 strikes the stop 125, however, lowering movement of the elevator and the fork 105 ceases and the block 100 in its continued travel with the disk 97 moves in opposite directions along said fork so that the spring 109 first expands to provide for stopping of the elevator and thereafter contracts to provide for raising of said elevator. These conditions prevail regardless of the position of the stop 120 which, when the infeed conveyor is adjusted vertically as before described, is likewise adjusted to thereby vary the length of the downward stroke of the elevator and insure that the top of the latter and the supporting surfaces of the infeed conveyor will always be in the same plane to thereby avoid obstruction of the packages when they are transferred from said conveyor to the elevator by the pusher 59.

The wrappers 127 (Fig. 18) for the packages 56 are delivered successively onto a table 128 which extends transversely of the machine and is supported by brackets 129, 130 (Fig. 17) bolted or otherwise suitably secured to the side frames 5 and 6, respectively. Each wrapper 127, when delivered onto the table 128, lays over an opening 131 therein through which the packages are pushed upwardly by the elevator 60, movement of the package upwardly through said opening acting to fold the wrapper around the top and opposite sides of the package while it is on the elevator.

The wrapper making and feeding mechanism (Figs. 1, 2, 3, 4, 17 and 18) is preferably operated and constructed as follows. Loosely mounted on the shaft 64 is a sprocket 132 (Fig. 1) around which passes a chain 133 that also passes around a sprocket 134. This sprocket 134 is fixed on a stub shaft 135 (Fig. 4) which is journaled in a suitable bearing 136 bolted or otherwise suitably secured on the side frame 5 at the top thereof. Fixed on the stub shaft 135 is a bevel gear 137 that meshes with a bevel gear 138 which is fixed on a shaft 139 extending longitudinally of the machine and journaled in suitable bearings on brackets 140, 141, 142 bolted or otherwise suitably secured to the side frame 5 at the top thereof. Fixed on the shaft 139 is a roller 143 and a gear 144. The gear 144 meshes with a gear 145 (Figs. 1 and 17) that is fixed on a shaft 146 journaled in suitable bearings on the brackets 141, 142 and carrying roller 147. Fixed on the shaft 139 at the end thereof opposite that carrying the gear 144 is a gear 148 (Figs. 1, 2 and 4) that meshes with an idler gear 149 adjustably mounted in an arm 150 pivoted at 151 on the bracket 142. The idler gear 149 meshes with a gear 152 that is fixed on one end of a shaft 153 journaled in suitable bearings on the brackets 141, 142. Fixed on the opposite end of the shaft 153 is a gear 154 (Figs. 1 and 17) that meshes with a gear 155 which is fixed on a shaft 156 extending parallel with the shaft 153 and journaled in suitable bearings on brackets 141, 142.

A pair of feed rollers 157 and 158 are fixed on the shafts 153 and 156, respectively, and said feed rollers, together with the rollers 143 and 147 are all driven together by the described gearing connecting them with the shaft 64. A web 159 of waxed wrapping paper is led between the feed rollers 157 and 158 from a roll 160 (Fig. 2) rotatably supported on brackets such as indicated at 161, said brackets being bolted or otherwise suitably secured to the side frame 5 of the machine and carrying standards such as indicated at 162 that support a tension roller 163 over which the web 159 is also led. The rollers 157, 158 feed the web to the rollers 143, 147 which, through the medium of a blade 164 on the roller 147 and a groove 165 intermittently receiving said blade and formed in the roller 143, successively cut the wrappers 127 from said web. As each wrapper 127 is cut from the web 159, it is delivered by rollers 143, 147 to mechanism which feeds the wrapper onto the table 128 over the opening 131 therein. This mechanism is preferably operated and constructed as follows.

Fixed on the shaft 93 (Fig. 5) is a bevel gear 166 which meshes with a bevel gear 167 that is fixed on a shaft 168 extending longitudinally of the machine and journaled in suitable bearings on brackets 169, 169 bolted or otherwise suitably secured to the side frame 5 of the machine. Fixed on the shaft 168 is a sprocket 170 around which passes a chain 171 (Figs. 2 and 5) that also passes around a sprocket 172 that is fixed on a shaft 173 (Fig. 4). This shaft 173, which extends parallel with the rollers 143, 147, is journaled in suitable bearings carried by table 128. Fixed on the shaft 173 is a feed roller 175 (Fig. 17) and a sprocket 176. A chain 177 that passes around the sprocket 176 (Fig. 4) also passes around a sprocket 178 which is fixed on a shaft 179 arranged in parallel spaced relation with the shaft 173. The shaft 179 is journaled in suitable bearings on the table 128 and carries a feed roller 180 (Fig. 17) which is driven through the described connections therefor with the shaft 173. Fixed on the shaft 173 at the end thereof opposite that carrying the sprockets 172, 176, is a sprocket 181 (Figs. 2 and 4) around which passes a chain 182. The chain 182 also passes around a sprocket 183 that is fixed on a shaft 184 extending in spaced parallel relation with the shafts 173 and 179. The shaft 184 is journaled in suitable bearings on the table 128 and carries a feed roller 185 (Fig. 17) which is driven through the described connections therefor with the shaft 173. The chain 182 that passes around the sprockets 181 and 183, also passes around an idler sprocket 186 (Figs. 2 and 4) adjustably mounted on a bracket 187 that is bolted or otherwise suitably secured on the cross member 7.

The rollers 175, 180, 185 project through suitable openings formed in the table 128, to feed the wrappers 127 thereover. Cooperating with said rollers are drop rollers 188, 189, 190, respectively, that are supported by an elongated bracket 191 that is bolted at 192, 193 on the cross member 8 and the side frame 5, respectively (Figs. 4 and 17). Journaled in suitable bearings on the bracket 191 is a rockshaft 194 having fixed thereon arms 195 that are pivotally connected at 196 with roller supports 197 that carry the rollers 188, 189 at the opposite ends thereof, respectively. Journaled in suitable bearings on the bracket 191 is a second rockshaft 198 having fixed thereon holders 199 for adjustable rods 200 that carry the rollers 190.

Each wrapper 127, when delivered by the rollers 143, 147 to the rollers 180, 189, is fed by the last mentioned rollers to the rollers 175, 188 which, together with the rollers 185, 190, feed the wrapper across the table 128 to a stop 201 (Figs. 4 and 17) which registers the wrapper with respect to the opening 131 and the package on the elevator 60 that passes upwardly through said opening. This stop 201 is adjustably secured at 202, 202 on the table 128 and can be moved thereon to various positions in accordance with various sizes of wrappers and packages handled in the machine.

When a wrapper 127 has been fed onto the table 128 and registered by the stop 201, the elevator 60, as previously pointed out, lifts a package 56 upwardly through the opening 131 so that the wrapper is folded around the top and two opposite sides of said package. At this time, the package is engaged between fingers 203, 204 (Figs. 1 and 3) carried on top rails 205 that extend longitudinally of the machine and engage the top of the package as it is pushed therethrough by conveying mechanism hereinafter described.

The fingers 203, 204 engage over the sides of the package when it is lifted by the elevator 60, the limit of upward travel of the elevator being adjusted by the pin 99 so that the bottom of the package is level with the top of a second table 206 (Figs. 1 and 18) over which the package is subsequently pushed by the conveyor mechanism above referred to. This table 206 is supported on cross members 207, 208, the cross member 207 in turn being supported by brackets or the like (not shown) secured on the table 128. The cross member 208 is mounted on the lower ends of brackets 209, 210 (Fig. 4). The bracket 209 is mounted on the shaft 198 and the bracket 210 is mounted on a rod 211 carried on the upper ends of supports 212. The supports 212 are secured to the table 128.

The rear edge of the table 206 is bent downwardly as clearly shown in Fig. 18, and said edge, together with the cross member 208 acts, when the package and wrapper is lifted by the elevator 60, to fold the wrapper around the front side of said package. The wrapper is folded around the rear side of the package by a cross bar 217 pivoted on yokes 217' and 217'' loosely mounted on the rockshaft 198 and the rod 211, respectively. The cross bars 207, 208, 217 are properly spaced vertically from the table 128 to provide for feeding of the wrappers 127 thereacross to the stop 201. The bar 208 carries a shaft 218 provided with fingers 219 which, when the package is lifted by the elevator 60, turn upwardly from a substantially horizontal position to a substantially vertical position and hold the lower front portion of the wrapper 127 in engagement with the package 56 (Figs. 3, 4 and 18). Fixed on the shaft 218 is a gear 220 which meshes with a gear 221 that is fixed on a stub shaft 222 journaled in suitable bearings on the bar 208 at one side of the path of travel of the packages. The stub shaft 22 has secured thereon a pin 223 to which is connected one extremity of a spring 224. The opposite extremity of the spring 224 is connected with a pin 225 fixed on one end of the bar 207. When the package is pushed over the table 206, as hereinafter described, the fingers 204 and 219 yield to provide for forward travel of the package, the fingers 219 turning forwardly and downwardly into suitable openings 226 formed in the table 206. Forward turning movement of the fingers 219 acts, through the gears 220, 221 to turn the shaft 222 so that the spring 224 is expanded. After the package passes over the fingers 219, the spring 224 acts to turn said fingers rearwardly for engagement with the next package that is lifted by the elevator 60. After the package and the wrapper have been lifted by the elevator 60 into engagement with the fingers 203, 204, the elevator 60 is lowered to receive the next package, thereby leaving the first package supported by said fingers in position to be pushed along the table 206 by the package conveyor. While the package is supported by the fingers 203, 204 and before it is pushed across the table 206, the rear edge of the wrapper is folded onto the bottom of the package by mechanism which is preferably operated and constructed as follows.

Fixed on the shaft 64 is a cam 227 (Figs. 5 and 12) in the groove of which is engaged a roller 228 journaled on one arm 229 of a bell crank that is loosely mounted on a shaft 69 supported by the cross member 9 (Fig. 12). The other arm 230 of this bell crank is pivotally connected, as by a universal connection 231, with one extremity of a link 232 the opposite extremity of which is pivotally connected at 233 with an arm 234 (Fig. 5). The arm 234 is fixed on or formed integrally with a sleeve 235 journaled on the stay shaft 76, and said sleeve has fixed thereon or formed integrally therewith a second arm 236. The arm 236 is pivotally connected, as by a universal connection 237, with one extremity of a link 238. The opposite extremity of the link 238 is connected, as by a universal connection 239, with an arm 240 of a bell crank that is pivoted at 241 on the cross member 8 (Figs. 3, 4 and 5). The other arm 242 of this bell crank is pivotally connected at 243 with one extremity of a link 244 the opposite extremity of which is pivotally connected at 245 with a slide 246 arranged for reciprocating movement in suitable guides formed on the bracket 89. Fixed on the forward end of the slide 246 is a folder plate 247 which is operated by the slide 246 and the connections therefor with the cam 227. This folder 247 is reciprocated by said connections in timed relation with the elevator 60 so as to move rearwardly as the elevator rises and forwardly when the elevator lowers. When the folder 247 moves forwardly, it folds the rear edge portion of the wrapper 127 onto the bottom of the package 56, (Fig. 18) whereupon the package conveyor pushes the package over the table 206 and thereby folds the forward edge portion of the wrapper onto the package over the folded rear edge portion of said wrapper. The package conveyor is preferably operated and constructed as follows.

Fixed on the shaft 64 is a sprocket 248 (Figs. 3, 5 and 12) around which passes a chain 249 that also passes around a sprocket 250 which is fixed on a shaft 251. This shaft 251 extends transversely of the machine and is journaled in suitable bearings on the side frames 5, 6 thereof. Fixed on the shaft 251 is a spur gear 252 that meshes with a spur gear 253 which is fixed on a shaft 254 extending in parallel relation with the shaft 251 and also journaled in suitable bearings on the side frames 5, 6 of the machine. Fixed on the shaft 254 is a balance wheel 255 and a sprocket 256 (Figs. 1 and 4) and passing around the sprocket 256 is a chain 257 that also passes around a sprocket 258. This sprocket 258 is fixed on a shaft 259 journaled in suitable bearings on brackets 260 secured to a yoke 261 that is bolted on the side frames 5, 6 of the machine. Fixed on the shaft 259 is a second sprocket 262 (Figs. 1 and 3) around which passes a continuously moving chain 263 having secured thereto at intervals along the same a series of continuously moving package pushers 264. The chain 263 also passes around a sprocket 265 that is journaled in suitable bearings on brackets 266 secured to a yoke 267 (Figs. 1 and 2) that is also bolted on or otherwise suitably secured to the side frames 5, 6 of the machine rearwardly of and in spaced relation with the yoke 261.

During travel of the pushers 264 with the chain 263, the base plates 268 of said pushers engage guides or ways 269, 270 that hold the pushers in proper position and prevent sagging of the chain 263. The ways or guides 269, 270 are bolted or otherwise suitably secured on the yokes 261, 267, and the top rails 205 are supported by the guide or way 270 through the medium of adjustable rods 271 (Figs. 1 and 2) that provide for vertical adjustment of the guides 205 in accordance with various sizes of packages handled in the machine. Adjustment of the rods 271 and the top rails 205 both vertically and laterally, is effected by the usual or any well known mechanism for this purpose that requires no detail description.

After the folder 247 has turned the rear edge of the wrapper onto the bottom of the package, one of the pushers 264 engages the package and pushes it past the fingers 204, 221 and along the table 206. In order to provide for movement of the package past the fingers 204, said fingers are arranged to swing about their pivots 272 against the action of springs 273 the opposite ends of which are secured to the fingers 204 and the top rails 205, respectively. After the package passes the fingers 204, the springs 273 return them to their normal vertical positions to be thereafter engaged with the next package as shown in Fig. 3. It was previously pointed out that movement of the package onto the table 206 folds the front edge portion of the wrapper onto the bottom of the package over the folded rear edge wrapper portion thereon. A seam in the form of overlapping wrapper portions is thus left on the bottom of the package, and during travel of the package along the table 206 said seam is sealed by mechanism preferably operated and constructed as follows:

Fixed on the shaft 93 (Figs. 3 and 26) is a cam 274 in the groove 275 of which is engaged a pin 276. The pin 276 extends laterally from, and is anchored in, a fork 277 engaged over the shaft 93 and reciprocated by the cam 275 through its action on the pin 276. The fork 277 is adjustably connected at 278 with one end of a rod 279 the opposite end of which is pivotally connected at 280 with an arm 281 fixed on a shaft 282. This shaft 282 is journaled in suitable bearings on the table supporting bar 207 (Fig. 18) and said shaft has fixed thereon a pair of arms 283 carrying a bar 284. The bar 284 is heated by a suitable resistance element (not shown) connected by a cable 285 with any suitable source of electrical current. As each package passes over the table 206, the bar 284 moves upwardly through an opening 286 in said table and engages the seam on the bottom of the package formed by the overlapping wrapper portion. The seam is thus heated and sealed, whereupon the bar 284 moves downwardly through the opening 286 and is thus disengaged from the bottom of the package. The reciprocating movements of the bar 284 imparted thereto by its connections with the cam 275 are so timed that said bar only engages the seam on the bottom of the package. It will thus appear that by the heating device just described, marring or disfiguring of the package, that might result from heating the entire bottom surface thereof, is avoided. After the bottom seam of the package has been sealed, the package is progressed along the table 206 onto spaced supporting rails 287 (Figs. 3 and 4) which extend longitudinally of the machine and are bolted or otherwise suitably secured to the framework thereof. As each package travels along the supports 287, it is fed past mechanism for folding in the ends of the wrapper on the package. This end folding mechanism (Figs. 3 and 20 to 24 inclusive) is preferably operated and constructed as follows:

Fixed on the shaft 259 (Fig. 3) is a sprocket 288 around which passes a chain 289 that also passes around a sprocket 290 which is fixed on a shaft 291. This shaft 291 is journaled in suitable bearings on brackets 292 bolted or otherwise suitably secured to the conveyor way 270 at the top thereof. Fixed on the shaft 291 is an eccentric gear 293 that meshes with an eccentric gear 294 which is fixed on a shaft 295 driven from the shaft 291 by said eccentric gears. The shaft 295 is also journaled in suitable bearings on the brackets 292, and keyed to and slidable along said shaft are a pair of sprockets 296, the hubs 297 of which are provided with grooves 298.

Extending transversely of the machine, and bolted or otherwise suitably secured to the side frames 5, 6, thereof, is a cross member 299 carrying a pair of standards 300 on which are mounted the upper end folders 301 and the lower end folders 302. The standards 300, the folders 301, 302, and the hereinafter described driving connections for said folders, may all be adjusted laterally of the machine in accordance with various sizes of packages wrapped thereby. For this purpose, the standards 300 have bolted or otherwise suitably secured thereto sleeves 303 that are internally threaded to engage oppositely threaded shafts 304 which, when rotated, adjust the standards 300 and the parts carried thereby along the cross member 299. The shafts 304 are journaled in and retained against endwise displacement relative to bearings 305 on the side frames 5, 6, and each of said shafts is provided with a hand wheel 306 for rotating the shafts to adjust the standards and folders relatively and laterally as above described.

Bolted or otherwise suitably secured on the standards 300, at the tops thereof, are rearwardly extending brackets 307 having secured thereto, or formed integrally therewith, yokes 308 which are engaged in the grooves 298 of sprockets 296 and move said sprockets along the shaft 295 when the standards 300 and the end folders 301, 302 are adjusted laterally. The upper end folders 301 are mounted on shafts 309 that are journaled in sleeves 310 which, together with the folders 301, are arranged for vertical adjustment in slots 311 formed in the standards 300. The folders 301 are retained in their positions of vertical adjustment by collars 312 formed on the sleeves 310 and engaging the standards 300 at one side thereof, and nuts 313 threaded on the reduced ends 313' of said sleeves and engaging said standards at the opposite sides thereof. The collars 312 are preferably formed integrally with the sleeves 310 and are provided with straight wall portions 314 that engage the walls of the slots 311 and prevent rotation of the sleeves therein. Fixed on the shafts 309 at the ends thereof opposite the folders 301 are sprockets 315 for driving said shafts and said folders.

The upper and lower end folders 301, 302 are driven by chains 316 which pass around the sprockets 296 and 315 and also around sprockets 317. The sprockets 317 are fixed on shafts 318 journaled in sleeves 319 extending through the slots 311 in the standards 300 and carrying the lower end folders 302. The sleeves 319 and the lower end folders 302 are adjustable vertically in the slots 311 and secured in the desired position of vertical adjustment by collars 320 and nuts 321. The nuts 321 are threaded on the reduced ends 321' of sleeves 319 and engage the standards 300 at one side thereof. The collars 320 are secured to or formed integrally with said sleeves and engage the standards at the opposite sides thereof. The collars 320 are provided with straight wall portions 322 which engage the walls of the slots 311 and prevent rotation of the sleeves 319. Adjustably secured on the sleeves 319 by the nuts 321, are arms 323 having openings 324 for the sleeves 319 and carrying stub shafts 325. Journaled on the stub shafts 325 are sprockets 326 on the hub portions 327 of which are secured, as by set screws 328, the lower end folders 302. The sprockets 326 and the end folders 302 are retained against longitudinal displacement on the stub shafts 325 by set screws 329 which extend through the hubs of said sprockets and said folders and have threaded engagement with the walls of openings 330 formed in the stub shafts 325 (Fig. 22). The end folders 302 are provided with recesses 331 which receive the heads of the screws 329 and washers 332 interposed between said heads and said folders and through which said screws extend.

The sprockets 326 and the folders 302 are driven by chains 333 which pass around said sprockets and also around sprockets 334 which are fixed on the shafts 318 that are driven by the chains 316. The tension of each of the chains 333 may be regulated as desired, by a plate 335 which is adjustable transversely of the corresponding arm 323 and secured thereto by a set screw 336 that passes through a slot 337 in said plate. Secured to or formed integrally with each plate 335 is a laterally extending stub shaft 338 having journaled on a reduced end portion 339 thereof a small sprocket 340 that engages the adjacent chain 333. This sprocket is retained on the reduced portion 339 of the stub shaft 338 by a nut 341 having threaded engagement with said reduced portion.

When packages having rectangular ends are wrapped in the machine, for example, the arms 323 are adjusted to substantially vertical positions so that the lower end folders 302 are disposed under the upper end folders 301 (Fig. 21). Under these conditions, the package on being pushed past the end folders by one of the pushers 264 is acted upon by said folders so that they first fold in and overlap the projecting upper and lower end portions of the wrapper and thereafter fold the rear projecting end portion of the wrapper over said upper and lower projection end portions thereof. The forward projecting end portions of the wrapper are then folded over those already mentioned by plates 342 (Figs. 4 and 25) disposed at opposite sides of the path of travel of the package and between which the same is pushed by the pusher 264 to delivery mechanism hereinafter described.

The plates 342 are provided with resistance elements 343 connected with any suitable source of electric current and acting to heat said plates so that they seal the opposite ends of the package when it is pushed toward the same by the pusher 264. The plates 342 have secured thereto or formed integrally therewith brackets 344 which are slidably mounted on a cross member 345 bolted or otherwise suitably secured on the conveyor way 270. The plates 342 may be adjusted to accommodate packages of various sizes by a shaft 346 that is journaled in and retained against endwise displacement from bearings 347 on the conveyor way 270. The shaft 346 has oppositely threaded portions having threaded engagement with the walls of suitable openings formed in small brackets 348 bolted or otherwise suitably secured to the brackets 344. When the shaft 346 is rotated, as by hand wheels 349 secured thereto, the plates 342 are moved in and out as desired, in accordance with the direction of rotation of said shafts.

In accordance with the present invention, the end folders are arranged so as to be capable of wrapping packages of various sizes and cross sectional forms. For example, the folders will wrap a package having square ends as well as a package having rectangular ends. This is preferably accomplished by means, such as the arms 323, whereby the lower end folders 302 may be replaced by folders 500 that are adjusted relatively to the upper end folders 301 to position the upper and lower sets of folders one in advance of the other as illustrated in Fig. 23 and shown diagrammatically in Fig. 24. When packages having square ends, for example, are wrapped in the machine, the lower end folders 500 and the arms 323 are adjusted angularly on the reduced portions 321' of the sleeves 319 to thereby adjust the upper and lower folders relatively so that the driving shafts 309 of the former occupy a position slightly in advance of the driving shafts 327 of the latter. In making this adjustment of the lower end folders 500, the drive therefore is not affected, because the aforesaid adjustment of the arms 323 is obtained by merely loosening the nuts 321, turning said arms to the desired positions, and tightening the nuts to hold the arms in said positions. The folders having been adjusted as shown in Figs. 23 and 24, packages with square ends are pushed past said folders by the pushers 264. As each such package reaches the folders 301, 500, the plate portions 301', 302' thereof fold in the upper and lower projecting end portions of the wrapper, whereupon the nose portions 301'' of the folders 301 fold in the rear projecting end portions of the wrapper. The front projecting end portions of the wrapper are then folded in by the plates 342 which act, as before described, to seal the ends of the package as it is pushed between said plates by the pusher 264.

In accordance with the present invention mechanism is provided for preventing displacement of the wrapper on the package by the end folders, and this mechanism (Figs. 1, 3, 4, and 29) is preferably operated and constructed as follows. Fixed on the shaft 254 (Fig. 4) is a sprocket 350 around which passes a chain 351. The chain 351 also passes around a sprocket 352 fixed on or formed integrally with a sleeve 353 (Fig. 29) that is journaled on a stub 354 secured to or formed integrally with a plate 355. The sleeve 353 is prevented from being displaced endwise on the stud shaft 354 by a washer 356 seated in a recess 357 of said sleeve, and a machine screw 358 which extends through the opening in said washer and has threaded engagement with the walls of a suitable opening 359 formed in the end of the stub shaft 354. The plate 355 is mounted for vertical adjustment on a bracket 360, the base 362 of which is bolted or otherwise suitably secured at 361 to the cross member 299. The bracket 360 carried by said cross member is provided with slots 363 through which extend machine screws 364. The machine screws 364 have threaded engagement with the walls of suitable openings 365 formed in the plate 355, and by loosening and tightening said machine screws, said plate may be moved vertically along the upper end of the bracket 360 and secured in any desired position of vertical adjustment thereon. The plate 355 is provided with spaced guide ribs 366 which engage over the upper vertical edges of the bracket 360 and prevent said plate from being displaced laterally therefrom.

Fixed on or formed integrally with the sleeve 353 is a spur gear 367 which meshes with a spur gear 368 that is fixed on or formed integrally with a sleeve 369. The sleeve 369 is journaled on a stud 370, one end of which has threaded engagement with the walls of a suitable opening 371 formed in the plate 355, the opposite end of said stud being provided with a head 372 preventing displacement of the sleeve 369 longitudinally of the stud. Fixed on or formed integrally with the sleeve 369 is a sprocket 373 around which passes a continuously moving chain 374 that also passes around a sprocket 375. The sprocket 375 is journaled on a stud 376 adjustably mounted in the slot 377 formed in the plate 355. The stud 376 is secured in adjusted position in the slot 377 by a nut 378 having threaded engagement with one end of said stud, and endwise displacement of the sprocket 375 is prevented by a head 379 formed on the opposite end of the stud. By adjusting the postion of the stud 376 in the slot 377, the tension of the chain 374 may be regulated as desired.

Adjustably mounted on and secured by suitable means to the chain 374, at intervals along the same, are plates 380 provided between their opposite ends with ribs 381 on which are bolted or otherwise suitably secured, as at 382, brackets 383 provided with clamps 384 that move continuously with said chain. The clamps 384 are driven continuously through the described driving connections therefor with the chain 374 and the shaft 254, and as each package is advanced by one of the pushers 264 to the end folders above described, one of the clamps 384 has traveled upwardly and forwardly to a point where it engages the front of the package and holds the wrapper tightly thereon to prevent displacement of the wrapper from the package by said end folders (Fig. 3). The movement of the clamps 384 is so timed with respect to the continuously moving pushers 264 that each package is clamped between one of said pushers and one of said clamps while the end folders are operating on the package. Upon completion of the operation of the end folders the clamp 384 that has been engaged with the front of the package moves downwardly and rearwardly and the next clamp 384 moves upwardly and forwardly in time to engage the front of the next package and clamp it between said clamp and the pusher 264 which is advancing said package. The end folders then operate on the last mentioned package, whereupon the clamp 384 engaged therewith moves away from said package as before described. These operations of the clamps 384 are repeated as the packages are brought successively to the end folders by the pushers 264 which, as previously pointed out, thereafter advance the packages successively between the heating plates 342 that finally fold and seal the ends of the packages.

The plate 355, which carries the clamps 384, and their driving devices, is inclined so that said clamps successively have imparted thereto by their operating mechanism, the upward and forward movement above described. In order to prevent sagging of the clamps 384 as they travel above the sprockets 373, 375, the bases 380 of said clamps engage with and are guided in an inclined guide 385 secured to or formed integrally with the plate 355 and extending laterally from one side thereof. The clamps 384, while traveling along the guide 385, are retained therein by strips 386 secured, as by set screws 387, to the opposite sides of the guide 385 and engaged over the opposite ends of the base plates 380 as they successively enter and travel along the guide 385. The opposite ends of the strips 386 are preferably bent upwardly, as at 388, to facilitate movement of the clamp carrying bases 380 into and out of the guide 385.

The sealed packages when pushed past the heating plates 342 by the pushers 264 are preferably received by a delivery mechanism that carries the packages to a suitable delivery station. This delivery mechanism may be of any suitable construction, and as herein shown is preferably operated by and embodies the following instrumentalities.

Keyed to and slidable along the shaft 254 are bevel gears 389 that mesh with bevel gears 390 which are fixed on vertical shafts 391 carried by frames 392 (Figs. 1, 3 and 4). The frames 392 carry sub-frames 393 in which are journaled vertically disposed series of rollers 394 over which pass belts 395. Said belts pass around pulleys 396 fixed on the shafts 391, and also around pulleys (not shown) journaled on the ends of the frames 392 opposite those carrying the shafts 391. The frames 392 and parts carried thereby are, together with the bevel gears 389, adjustable toward and away from each other to accommodate packages of various sizes. The pushers 264 of the wrapping machine advance the wrapped and sealed packages successively between the inner ends of the belts 395, and said belts, together with the rollers 394, advance and press the sealed packages in a manner well understood in the art and requiring no detailed explanation.

In wrapping machines embodying the present invention, it is desirable to control the wrapper feeding mechanism in accordance with the presence or absence of packages on the in-feed conveyor therefor. Accordingly, the wrapping machine herein described and illustrated is equipped with a paper feed control mechanism (Figs. 1, 3, 5 to 8, inclusive, 12, and 13 to 16, inclusive) that is preferably constructed and operated as follows.

Adjustably connected with the bell crank arm 70 (Fig. 12), as by pin and slot connection 397, 398, is a link 399 that is pivoted at one end on the pin 397. The opposite end of said link is pivotally connected at 400 with the free end of an arm 401 that is fixed on a rock shaft 402 extending transversely of the machine and journaled in suitable bearings on the side frames 5, 6, thereof. The arm 70, as previously described, forms part of a bell crank that is rocked by the cam 65, and it will therefor appear that when the arm 70 is rocked the shaft 402, through the described connections therefor with said arm, will also be rocked. Fixed on the shaft 402 to rock therewith is a second arm 403, the free end of which is pivotally connected with one extremity of a rod 404. The opposite extremity of the rod 404 projects through a suitable opening formed in an L-shaped bracket 405 (Figs. 6 and 8) which is riveted or otherwise suitably secured to one of the frame members 47, 47 of the in-feed conveyor.

Secured to and projecting from the vertical side of the bracket 405 is a pin 406 on which is journaled a block 407. Secured to the block 407 and extending at right angles to the pin 406 is a pin 408 on which is journaled an arm 409 of a package detector 410 that extends over the in-feed belt 50 transversely thereof. The detector carrying arm 409 extends upwardly through a slot 411 cut in the horizontally disposed portion of the bracket 405 and of irregular formation to provide for swinging movement of the detector 410 about the angularly related pivots 406 and 408.

When a package on the conveyor belt 50 reaches the detector 410, it engages said detector and swings the same forwardly about the pivot 406. The arm 409 of the detector carries a detent 412, which, on forward swinging movement of the detector, moves into the path of travel of a block 413 that is fixed on the reciprocating rod 404. The reciprocating block 413 is then engaged between the detent 412 and the arm 409, and swings the detector 410 about the pivot 408.

The detector 410 is thus moved laterally out of engagement with the package and this lateral movement of the detector is utilized to start the paper feeding mechanism which then feeds and cuts a wrapper and delivers it in position to be associated with the incoming package.

For this purpose, the detector 410 has pivotally connected therewith, as at 414, one end of a rod 415 the opposite end of which is pivotally connected, as at 416, with an arm 417 that is fixed on a rock shaft 418 extending transversely of the machine and journaled in suitable bearings on the side frames 5, 6 thereof. It will be remembered that the detector 410 is arranged to swing forwardly and then laterally with respect to the in-feed conveyor. The forward swinging movement of the detector 410 is very slight and determined by the width of the enlarged part of the slot 411. When the detector 410 is swung forwardly, a similar movement is imparted to the rod 415, and to accommodate this movement of said rod, the pivotal connections 414 and 416 are of such character as to provide for said movement of said rod.

Fixed on the rock shaft 418 is an arm 419 that has pivotally connected therewith, as at 420, one extremity of a link 421. The opposite extremity of said link is pivotally connected, as at 422, with one end of a lever 423 that is pivoted at 424 on a bracket 425 bolted or otherwise suitably secured to the side frame 5. The opposite end of the lever 423 is bent downwardly and laterally to provide a nose 426 which is adapted to engage a lever 427. This lever 427 is pivoted at 428 on the lower end of an arm 429 which in turn is pivoted at 430 on a boss 431 (Fig. 13) that extends forwardly from an upstanding web portion 432 of the bracket 425.

The arm 429 and the lever 427 carried thereby are continuously rocked back and forth about the pivot 430 by a cam 433 and a spring 436'. The cam 433 is fixed on the shaft 64 and engages a roller 435 that is journaled at 436 on the free end of the arm 429. The spring 436' has its opposite ends secured to pins 437 and 438 which are anchored in suitable openings formed in the bracket 425 and the hub 439 of the arm 429, respectively.

When the nose 426 of the lever 423 engages the continuously swinging lever 427, the latter is moved downwardly into alinement with one arm 440 of a horizontally arranged bell crank 441 that is pivoted at 442 on the bracket 425 at the underside thereof. A spring 443, which has its opposite ends connected with pins 444 and 445 secured to the bell crank 441 and the bracket 425, respectively, normally tends to hold the other arm 446 of said bell crank alined and engaged with the nose 447 of a pawl 448 that is pivoted at 449 on a disk 450. This disk 450 (Fig. 16) is loosely mounted on the shaft 64 which extends through a sleeve 451 of said disk that is journaled in a suitable bearing 452 on the side frame 5 of the machine. Rigidly secured on the sleeve 451 of disk 450 is the sprocket 132 which, when the disk 450 is rotated, acts through the previously described driving connections between said sprocket and the paper feeding and cutting mechanism, to drive the latter and thus cut a wrapper and feed it into position to be associated with the incoming package.

The rocking lever 427, when swung downwardly by the nose 426 of lever 423, engages the arm 440 of bell crank 441 and swings it about the pivot 442 so that the arm 446 is disengaged from the nose 447 of pawl 448. Fixed on the shaft 64 is a disk 453 that rotates continuously with said shaft and is provided with a shoulder 454 (Fig. 15). This shoulder 454 is formed by cutting away a part of the disk 453 to form an eccentric portion 455 thereon. A spring 456 mounted at 457 on the disk 450 engages the nose 458 of the pawl 448. When the arm 446 of bell crank 441 is released from the nose 447 of said pawl, the nose 458 thereof is forced inwardly by the spring 456 and engages the shoulder 454 on the rotating disk 453. A driving connection is thus established between the disks 450 and 453, whereupon the sprocket 132 is rotated to drive the paper feeding and cutting mechanism as before described.

It will be understood, of course, that connection of the clutch just described occurs when the forwardly tilted detector 410 is pulled to the right (Fig. 12) by the rod 404. When said detector is pushed to the left by said rod, the connections for the latter with the lever 423 moves said lever so that the nose 426 thereof is lifted. A spring 459 which has its opposite ends connected at 460 and 461 with the lever hub 439 and the lever 427, respectively, then acts to lift the last mentioned lever above the arm 440 of the bell crank 441. The spring 443 then acts to move the arm 446 into the path of travel of the pawl 448. The nose 462 of said pawl subsequently engages the bell crank arm 446 so that the pawl is swung in a counterclockwise direction (Fig. 15) about the pivot 449. The nose 458 of the pawl is thus disengaged from the shoulder 454 of the disk 453, thereby breaking the driving connection between said disk and the disk 450 and stopping the operation of the paper feeding and cutting mechanism. When the pawl 448 is disengaged from the shoulder 454 as just described, the nose 447 of said pawl engages the bell crank arm 446 and stops rotation of the disk 450. At this time, a weighted pawl 463, which is pivoted at 464 on the bracket 425, drops into engagement with a shoulder 465 on the disk 450 and thus prevents rebound or back-lash of said disk and the pawl 448 carried thereby.

When the detector is moved to the left (Fig. 12) to disconnect the clutch as just described, said detector will, in the absence of a package on the conveyor belt 50, swing rearwardly about the pivot 406. This rearward swinging movement of the detector disengages the detent 412 from the block 413 on the continuously reciprocating rod 404, and the clutch for the wrapper cutting and feeding mechanism will remain disconnected until the detector is again swung forwardly by engagement of a package therewith. It is thus insured that each time a package strikes the detector a wrapper for said package will be cut and fed by the paper feeding and cutting mechanism, but if there are no packages on the in-feed belt 50 or for some reason a package fails to engage the detector, the paper feeding mechanism will not operate until the trouble has been remedied.

The operation of the entire machine will be clearly understood from the foregoing and may be briefly summarized as follows. When a package on the in-feed belt 50 strikes the detector 410, the operation of the paper feeding and cutting mechanism is started and a wrapper 127 is fed across the table 128 and positioned over the opening 131 therein to be associated with the incoming package. The package then travels to the inner end of the conveyor 50 and strikes the stationary stop (not shown) previously referred to. The package pusher 59 then pushes the package onto the elevator 60 which subsequently rises and carries the package upwardly to a point where the bottom thereof is in the plane of the table 206. During rising movement of the package, the wrapper 127 is folded around the top and sides thereof as previously described, and the fingers 221 are lifted and engaged with the front of the package. The package is engaged between the fingers 203, 204 which support the package when the elevator is lowered. After the elevator has been lowered, the folder 247 moves forwardly and folds in the rear depending portion of the wrapper on the bottom of the package. One of the continuously moving pushers 264 then engages the package and moves it forwardly over the fingers 221 and the table 206 so that the forward depending portion of the wrapper is folded upon the bottom of the package over the wrapper portion already folded thereon.

As the package is pushed over the table 206 by the pusher 264, the seam formed by the overlapping wrapper portions on the bottom of the package passes over the opening 286 in the table 206. This seam is then sealed, as before described, by the oscillating heated bar 284, whereupon the package is advanced along the support 287 to the end folders 301, 302. At this time, one of the continuously traveling clamps 384 engages the front of the package to hold the wrapper thereon, and the top, bottom and rear end folds of the partially wrapped package are made by the end folders 301, 302.

When these folds are made, the clamp 384 is disengaged from the package and the latter is advanced by the pusher 264 between the heated plates 342. These plates, as before described, fold in the front end folds of the wrapper over those previously made and secure all of the folds together so that the ends of the package are completely sealed. The package is then advanced by the pusher 264 between the belts 395 and rollers 394 which press the end sealed portions of the package and carry said package to the point of delivery. These operations are repeated in a substantially continuous manner on each package fed into the machine by the in-feed belt 50.

While devices embodying the present invention are herein disclosed in association with a wrapping machine, certain of said devices may be used singly, or in combination, in other types of machines. It is therefore to be expressly understood that the invention is not limited to the particular embodiment thereof herein described and illustrated, or otherwise than by the terms of the appended claims.

What is claimed is:—

1. In a machine of the character described, the combination with continuously movable means for advancing an article having a wrapper overlapped on the bottom thereof to provide a seam, of a heated element movable toward and away from the bottom of the article and adapted to engage and seal said seam, and means for operating said element timed to move the same so that it engages the seam of the wrapper only.

2. In a machine of the character described, the combination with continuously movable means for advancing an article having a wrapper overlapped on the bottom thereof to provide a seam, of a support along which the article is advanced by said means and having an opening therein, a heated element movable through the opening to engage and seal said seam when it is disposed over said opening, and means for operating said element timed to move the same so that it engages the seam of the wrapper only.

3. In a machine of the character described, the combination with continuously movable means for advancing an article having a wrapper overlapped on the bottom thereof to provide a seam, of a heated element movable toward and away from the article and above which the latter is advanced by said means, and means for operating said element timed to move the same so that it engages the seam of the wrapper only.

4. In a machine of the character described, the combination with continuously movable means for advancing an article having a wrapper overlapped thereon to provide a seam, of a pivoted heater movable toward and away from the article and adapted to engage and seal said seam, and mechanism, for operating said heater timed to move the same so that it engages the seam of the wrapper only, said mechanism comprising a driven cam and a rod operated thereby and connected with the heater at one side of the pivot therefor.

5. In a machine of the character described, the combination with continuously movable means for advancing an article having a wrapper overlapped thereon to provide a seam, of a pivoted heater movable toward and away from the article and adapted to engage and seal said seam, and mechanism for operating said heater timed to move the same so that it engages the seam of the wrapper only, said mechanism comprising a driven shaft, a cam fixed on said shaft to rotate therewith, a member connected with the heater at one side of its pivot and provided with a forked end engaged over the driven shaft, and a pin projecting from said member into the groove of said cam.

6. The combination with means for advancing articles having wrappers thereon, of a pair of driven elements adapted to carry devices for end folding the wrappers on the articles advanced by said means, and means for adjusting said driven elements relatively in the direction of travel of the articles so that the folding devices may be positioned to fold end portions of wrappers on articles of various sizes and cross sectional forms.

7. The combination with means for advancing articles having wrappers thereon, of a pair of driven elements adapted to carry devices for end folding the wrappers on the articles advanced by said means, and means for adjusting said driven elements relatively toward and away from each other and in the direction of travel of the articles so that the folding devices may be positioned to fold end portions of wrappers on articles of various sizes and cross sectional forms.

8. The combination with means for advancing articles having wrappers thereon, of mechanism past which the articles are advanced by said means and comprising an upper driven element and a lower driven element each adapted to carry a device for end folding the wrappers, and means for adjusting said driven elements relatively one in advance of the other so that the end folding devices may be positioned to fold end portions of wrappers on articles of various sizes and cross sectional forms.

9. The combination with means for advancing articles having wrappers thereon, of mechanism past which the articles are advanced by said means and comprising two pairs of driven elements adapted to carry devices for end folding the wrappers, and means for adjusting the pairs of elements relatively in the direction of travel of the articles so that the folding devices may be positioned to fold end portions of wrappers on articles of various sizes and cross sectional forms.

10. The combination with means for advancing articles having wrappers thereon, of folding mechanism past which the articles are advanced by said means and comprising two pairs of driven elements adapted to carry devices for end folding wrappers on the articles advanced by said means, the driven elements of each pair being adjustable toward and away from each other and said pairs of elements being relatively adjustable in angularly related directions so that the folding devices may be positioned to fold end portions of wrappers on articles of various sizes and cross sectional forms.

11. The combination with means for advancing articles having wrappers thereon, of an upper driven element and a lower driven element each adapted to carry a device for end folding wrappers on the articles advanced by said means, one of said driven elements being adjustable rearwardly of the other driven element so that the folding devices may be positioned to fold end portions of wrappers on articles of various sizes and cross sectional forms.

12. In a folding mechanism, an upper driven element and a lower driven element each adapted to carry a device for folding in end portions of wrappers on traveling articles, and means for adjusting said elements relatively in the direction of travel of the articles so that the folding devices may be positioned to fold end portions of wrappers on articles of various sizes and cross sectional forms.

13. In a folding mechanism, an upper driven element and a lower driven element each adapted to carry a device for end folding wrappers on articles, and means for moving the lower driven element rearwardly of the upper driven element so that the folding devices may be positioned to fold end portions of wrappers on articles of various sizes and cross sectional forms.

14. In a folding mechanism, a pair of driven elements adapted to carry devices for end folding wrappers on traveling articles, and means for relatively adjusting said driven elements vertically and longitudinally with respect to the path of travel of the articles so that the folding devices may be positioned to fold end portions of wrappers on articles of various sizes and cross sectional forms.

15. In a folding mechanism, an upper driven element and a lower driven element each adapted to carry a device for end folding wrappers on articles, said driven elements being relatively adjustable vertically and said lower driven element being adjustable rearwardly of the upper driven element so that the folding devices may be positioned to fold end portions of wrappers on articles of various sizes and cross sectional forms.

16. In a folding mechanism, an upper end folder driving element and a lower end folder driving element, means for driving the same, and means for adjusting said end folder driving elements relatively one in advance of the other without affecting said driving means.

17. In a folding mechanism, an end folder driving shaft, a second shaft, means adjustable about the axis of the second shaft and carrying a second end folder driving shaft, and devices for driving said shafts unaffected by adjustment of said means and the end folder driving shaft carried thereby.

18. In a folding mechanism, a pair of driven elements movable vertically and horizontally, a shaft driven from one of said elements, a member carried by said shaft and movable about the axis thereof to various positions of adjustment, and means for mounting the other driven element on said member for adjustment therewith.

19. In a folding mechanism, a pair of folder driving elements, means for driving one of the same, a support for the other folder driving element, a shaft about which said support and the folder driving element carried thereby may be swung to various positions of adjustment, and driving connections for said shaft with the last named folder driving element and said driving means.

20. In a folding mechanism, a folder driving shaft, a second shaft driven therefrom, a support mounted on the second shaft to swing about the axis thereof, a folder driving shaft mounted on the support for swinging movement therewith, and means for driving the last named folder driving shaft from said second shaft regardless of the position of said support and the folder driving shaft mounted thereon.

21. In a folding mechanism, a folding device comprising a plate, a second folding device comprising plate provided with a thumb, a pair of driving shafts each adapted to carry one of said folding devices, and means for adjusting the shafts relatively whereby the folding devices may fold end portions of a wrapper on an article having a square end.

22. In a folding mechanism, a pair of rotatable folding devices, and means for mounting one of said folding devices for adjustment of its axis of rotation to positions along an arc with respect to the other of said devices whereby it may be positioned so that said folding devices may fold end portions of a wrapper on an article having a square end.

23. In a folding mechanism, a pair of driven folders, and a pivoted member carrying one of said folders and adapted to position it so that both folders may fold end portions of a wrapper on an article having a square end.

24. The combination with means for advancing articles having wrappers thereon, and means for folding end portions of the wrappers on the articles successively, of a single means independent of said advancing means and adapted to clamp each article on said advancing means while the end portions of its wrapper are being folded by said folding means.

25. The combination with means for advancing an article having a wrapper thereon, and means for folding end portions of the wrapper on the article, of traveling means independent of said advancing means and adapted to clamp the article on said advancing means while the end portions of its wrapper are being folded by said folding means.

26. The combination with means for advancing articles having wrappers thereon, and means for folding end portions of the wrappers on the articles successively, of one or more elements traveling independently of said advancing means and adapted to clamp each article on said advancing means while the end portions of its wrapper are being folded by said folding means.

27. The combination with continuously operated means for advancing articles having wrappers thereon, and devices for folding end portions of the wrappers on the continuously advanced articles successively, of continuously operated means independent of said advancing means and adapted to clamp each article on said advancing means while the end portions of its wrapper are being folded by said folding means.

28. The combination with means for folding end portions of a wrapper on an article, and a moving conveyor for advancing the article with the wrapper thereon past the folding means, of an element movable independently of said conveyor and adapted to clamp the article on the conveyor while said means is folding the end portions of the wrapper on said article, and means for moving said element so that it clamps the article on the conveyor, travels therewith during the folding operation, and thereafter releases the article and moves back to clamp a succeeding article on the conveyor.

29. The combination with means for folding end portions of wrappers on successive articles, and a conveyor for advancing articles with wrappers thereon successively past said folding means, of one or more movable devices independent of the conveyor and adapted to clamp the articles on the conveyor successively while the end portions of their wrappers are being folded by the folding means, and mechanism for moving said device or devices into and out of engagement with the articles successively.

30. The combination with means for folding end portions of a wrapper on an article, and a conveyor for advancing the article with the wrapper thereon past said folding means, of an independently mounted driven element movable toward and in the direction of travel of said conveyor to clamp the article on said conveyor while the end portions of its wrapper are being folded by the folding means.

31. The combination with means for folding end portions of a wrapper on an article, and a conveyor for advancing the article with the wrapper thereon past said folding means, of an independent element supported for movement toward and in the direction of travel of the conveyor to clamp the article on said conveyor while the end portions of its wrapper are being folded by the folding means, and mechanism for moving said element toward and in the direction of travel of the conveyor and thereafter adapted to move the element away from the conveyor and in a direction opposite to that of the travel thereof.

32. The combination with means for folding end portions of wrappers on successive articles, and a conveyor for advancing articles with wrappers thereon successively past said folding means, of a plurality of elements independent of said conveyor and supported to move toward and in the direction of travel of the conveyor and successively clamp articles on said conveyor while their wrappers are being folded by said folding means, and mechanism for moving said elements successively toward and in the direction of travel of the conveyor and then away from the conveyor and in a direction of travel opposite to that of said conveyor.

33. The combination with means for folding end portions of a wrapper on an article, and a conveyor for advancing the article with the wrapper thereon past said folding means, of means supported independently of the conveyor adapted to travel toward and with the same and clamp articles successively on the conveyor while their wrappers are being folded by the folding means, and mechanism for moving said clamping means toward and in the direction of travel of the conveyor and then away from the conveyor and in a direction of travel opposite to that of the conveyor.

34. In a machine of the character described, the combination with means for advancing wrapped articles past folding devices and means for clamping said articles successively while end portions of wrappers thereon are being successively folded, of a driven endless element independent of said advancing means carrying the clamping means and adapted to successively engage said clamping means with and disengage the same from said articles.

35. In a machine of the character described, conveyor means continuously movable in one direction for advancing a plurality of wrapped articles in succession past folding devices, a single device for clamping successive articles while end portions of wrappers thereon are being successively folded, and means for moving said device into and out of engagement with successive articles.

36. In a machine of the character described, conveyor means continuously movable in one direction for advancing a plurality of wrapped articles in succession past folding devices, a single unitary mechanism for clamping successive articles while end portions of wrappers thereon are being successively folded, and means for continuously driving said mechanism.

37. In a machine of the character described, conveyor means continuously movable in one direction for advancing a plurality of wrapped articles in succession past folding devices, a single means for holding wrappers on successive articles against displacement relative thereto while end portions of said wrappers are being successively folded, and mechanism for successively engaging said means with and disengaging the same from the articles and wrappers thereon.

38. In a machine of the character described, a continuously moving conveyor for advancing a plurality of wrapped articles past folding devices, a driven chain independent of said conveyor, and one or more elements mounted on said chain to move therewith and successively hold wrappers on articles against displacement relative thereto while end portions of said wrappers are being successively folded.

In testimony whereof I have signed this specification.

G. H. BENT.